(12) United States Patent
Jones

(10) Patent No.: US 12,214,714 B2
(45) Date of Patent: Feb. 4, 2025

(54) SHIPPING CONTAINER FASTENER AND METHOD

(71) Applicant: Sean Phoenix Jones, The Plains, OH (US)

(72) Inventor: Sean Phoenix Jones, The Plains, OH (US)

( * ) Notice: Subject to any disclaimer, the term of this patent is extended or adjusted under 35 U.S.C. 154(b) by 794 days.

(21) Appl. No.: 17/243,743

(22) Filed: Apr. 29, 2021

(65) Prior Publication Data

US 2021/0339673 A1 Nov. 4, 2021

Related U.S. Application Data

(60) Provisional application No. 63/017,201, filed on Apr. 29, 2020.

(51) Int. Cl.
*B60P 7/13* (2006.01)

(52) U.S. Cl.
CPC ..................... *B60P 7/13* (2013.01)

(58) Field of Classification Search
CPC ......................................... B60P 7/13
USPC .................................. 410/85, 105
See application file for complete search history.

(56) References Cited

U.S. PATENT DOCUMENTS

| | | | | | |
|---|---|---|---|---|---|
| 673,832 A | * | 5/1901 | Eason | ..................... | F16B 39/32 411/326 |
| 964,813 A | * | 7/1910 | Roedler | ................. | F16B 39/24 411/957 |
| 2,075,754 A | * | 3/1937 | Williams | ................. | G01B 3/18 81/55 |
| 2,099,116 A | * | 11/1937 | Kalmbach | ................. | B66C 1/66 411/401 |
| 2,994,395 A | * | 8/1961 | Hall | ........................ | B60R 16/04 180/68.5 |
| 3,140,671 A | * | 7/1964 | Kozak | ..................... | B60P 7/132 292/57 |

(Continued)

FOREIGN PATENT DOCUMENTS

DE 19818017 A1 10/1999
EP 0 228 358 B1 2/1990

(Continued)

OTHER PUBLICATIONS https://www.merriam-webster.com/dictionary/slot?utm_campaign=sd&utm_medium=serp&utm_source=jsonld (Year: 2024).*

*Primary Examiner* — Hilary L Gutman
(74) *Attorney, Agent, or Firm* — Jason H. Foster; Kremblas & Foster

(57) ABSTRACT

A fastener for fastening an ISO container to a ship, truck, trailer, another ISO container or other structure. In one embodiment an elongated nut is inserted into an elongated aperture of the ISO container's corner casting, and is rotated 90 degrees to be transverse to the longitudinal axis of the aperture. A threaded shaft is rotated, after being inserted in a slot of a plate mounted to the structure, causing the plate and elongated nut to be drawn closer to one another, thereby clamping the corner casting between the nut and the plate. In another embodiment an elongated nut is inserted into the elongated aperture and is rotated 90 degrees. A line extends from a winch mounted to the structure and is mounted to a loop at the opposite end from the nut. The winch tightens the strap, drawing the loop, nut and, thereby, the container against the structure.

15 Claims, 22 Drawing Sheets

(56) References Cited

U.S. PATENT DOCUMENTS

| | | | |
|---|---|---|---|
| 3,521,845 A | 7/1970 | Sweda et al. | |
| 3,557,895 A * | 1/1971 | Thomas | H01M 50/264 |
| | | | 180/68.5 |
| 3,647,172 A * | 3/1972 | Van Der Molen | B60P 7/13 |
| | | | 410/85 |
| 3,872,555 A | 3/1975 | Link et al. | |
| 3,880,090 A * | 4/1975 | Duclos | B60P 7/13 |
| | | | 410/77 |
| 3,904,439 A * | 9/1975 | Barrett, Jr. | H01M 50/262 |
| | | | 220/769 |
| 3,972,500 A | 8/1976 | Johnson et al. | |
| 4,068,878 A | 1/1978 | Wilner | |
| 4,139,228 A | 2/1979 | Varadi | |
| 4,163,425 A * | 8/1979 | Bedard | B61D 45/007 |
| | | | 410/82 |
| 4,452,555 A | 6/1984 | Calabro | |
| 4,648,764 A | 3/1987 | Pavlick | |
| 4,708,549 A * | 11/1987 | Jensen | B64D 11/0696 |
| | | | 410/116 |
| 4,828,308 A | 5/1989 | Riedl | |
| 4,830,531 A * | 5/1989 | Condit | F16B 37/045 |
| | | | 403/348 |
| 4,993,125 A * | 2/1991 | Capron | B65D 90/0006 |
| | | | 410/82 |
| 5,139,359 A | 8/1992 | Rakar et al. | |
| 5,351,372 A * | 10/1994 | Ihara | B60P 7/0823 |
| | | | 410/105 |
| 5,498,097 A | 3/1996 | Shapess | |
| 5,699,875 A * | 12/1997 | Dugan | A62B 35/0068 |
| | | | 52/27 |
| 6,074,142 A | 6/2000 | Schulz | |
| 6,318,947 B1 | 11/2001 | Hahn et al. | |
| 6,655,905 B1 | 12/2003 | Landoll et al. | |
| 7,125,212 B2 | 10/2006 | Moore et al. | |
| 7,401,995 B2 * | 7/2008 | Senakiewich, II | B60P 7/0815 |
| | | | 403/258 |
| 8,337,127 B2 * | 12/2012 | Moradians | B60P 7/0815 |
| | | | 410/104 |
| 8,490,806 B2 | 7/2013 | Yurgevich | |
| 10,322,504 B2 * | 6/2019 | Gallup | B65D 90/0026 |
| 10,422,368 B2 | 9/2019 | Dagenais et al. | |
| 11,846,310 B2 * | 12/2023 | Worden | H02S 30/00 |
| 2008/0014041 A1 | 1/2008 | Randazzo et al. | |
| 2015/0089981 A1 * | 4/2015 | Renfro | H01M 50/278 |
| | | | 70/164 |
| 2016/0332581 A1 | 11/2016 | Almhill et al. | |
| 2016/0368706 A1 | 12/2016 | Omuta | |
| 2017/0129697 A1 | 5/2017 | Reynard | |
| 2018/0118542 A1 | 5/2018 | Shelagowski et al. | |

FOREIGN PATENT DOCUMENTS

| | | | |
|---|---|---|---|
| FR | 2655597 A1 * | 6/1991 | B60P 7/13 |
| WO | 2011/039456 A1 | 4/2011 | |
| WO | 2017/045037 A1 | 3/2017 | |

* cited by examiner

SHIPPING CONTAINER FASTENER AND METHOD

CROSS-REFERENCES TO RELATED APPLICATIONS

This application claims the benefit of U.S. Provisional Application No. 63/017,201 filed Apr. 29, 2020. The prior application is hereby incorporated by reference.

STATEMENT REGARDING FEDERALLY-SPONSORED RESEARCH AND DEVELOPMENT (Not Applicable)

THE NAMES OF THE PARTIES TO A JOINT RESEARCH AGREEMENT (Not Applicable)

REFERENCE TO AN APPENDIX (Not Applicable)

BACKGROUND OF THE INVENTION

The invention relates generally to shipping container transport, and more particularly to devices and methods for fastening shipping containers to the decks and other supporting structures of vehicles, including ships, trucks, trailers and others.

Intermodal containers, also known as ISO ("International Organization for Standardization") containers 2 are ubiquitous in the shipping and transport industry and are shown in FIGS. 1 and 2. There are size requirements and other criteria that must be met in order for a container to be considered an ISO container.

One feature of ISO containers is corner castings 4 at all eight corners of the container that are used to secure the container to a truck bed, a trailer, a ship, or to lift the container. Historically, shipping workers have used chains with hooks to attach ISO containers to truck beds, ships and one another, but there are limitations to these methods that are well known. For example, chains are time-consuming to install, they require significant strength to deploy and remove, and substantial skill is required to properly attach containers to support structures and to one another. There is a need for other attaching means and processes.

BRIEF SUMMARY OF THE INVENTION

Disclosed herein is an apparatus for fastening an ISO container to a supporting structure. The apparatus comprises a lock plate having at least one slot near a first lock plate end. The apparatus also comprises a shaft for extending through the at least one slot. The apparatus also comprises an elongated nut that is disposed on the shaft for extending through an elongated aperture formed in the container. In some embodiments, the apparatus further comprises at least one hook on the lock plate near a second, opposite lock plate end for mounting on the structure. In some embodiments, the shaft and an opening through the elongated nut, through which the shaft extends, are threaded. The threading permits a portion of the container between the plate and the elongated nut to be clamped by rotating the threaded shaft relative to the threaded elongated nut. In some embodiments, each of the shaft and the elongated nut has one of a tooth and a pawl constituting a ratchet mechanism. The ratchet mechanism permits clamping of at least a portion of the container between the plate and the elongated nut by displacing the shaft along the shaft's length relative to the elongated nut.

Disclosed herein is a method of fastening an ISO container to a supporting structure. The method comprises aligning a longitudinal axis of an elongated nut, which is disposed on a shaft, substantially parallel to a longitudinal axis of an elongated aperture of a corner casting on the ISO container. The method also comprises extending the nut through the elongated aperture while maintaining the substantially parallel relationship. The method also comprises rotating the nut, after the nut has passed through the elongated aperture, until the longitudinal axis of the nut is oriented transverse to the longitudinal axis of the elongated aperture. This orientation permits the nut to resist removal of the nut from the corner casting. Some embodiments of the method further comprise extending the shaft through at least one slot in a lock plate near a first lock plate end and attaching a second, opposite lock plate end to the supporting structure. The step of attaching the second, opposite end of the lock plate to the supporting structure may comprise extending at least one hook, which is mounted near the second lock plate end, around the supporting structure. In some embodiments, the method further comprises extending a tying member from a loop, which is formed near an opposite end of the shaft from the elongated nut, to the supporting structure.

Disclosed herein is an apparatus for fastening an ISO container to a supporting structure. The apparatus comprises an elongated nut at a first end of a shaft and a loop at a second, opposite end of a shaft for attaching to the structure. Some embodiments further comprise at least one pivot axle in the shaft between the loop and the elongated nut, whereby the nut is pivotable relative to the loop. In some embodiments, the elongated nut may have a face that is aligned along a first plane, and the shaft extends at an angle to the first plane that is neither parallel nor perpendicular.

Disclosed herein is a fastener that attaches to the corner castings of ISO containers to make a direct attachment between the ISO container and the structure upon which the container rests before and during transport. Corner castings have vertically-elongated apertures, and embodiments of the invention have elongated nuts that are inserted into the elongated apertures in one orientation, such as with the longitudinal axis in a vertical orientation (parallel to the longitudinal axis of the corner casting aperture), and then are rotated about 90 degrees.

In one embodiment, a threaded shaft that attaches to the elongated nut is tightened against a plate that is hooked to the structure supporting the container by inserting the shaft into a slot in the plate. The plate is thereby tightened against the container and the supporting structure, locking them together. In another embodiment, a tying member, which may be a fabric strap, flexible line, cable or chain, is attached to a loop in the fastener. The strap is attached to the supporting structure and tightened to draw the container tightly to the structure.

Figure 1:
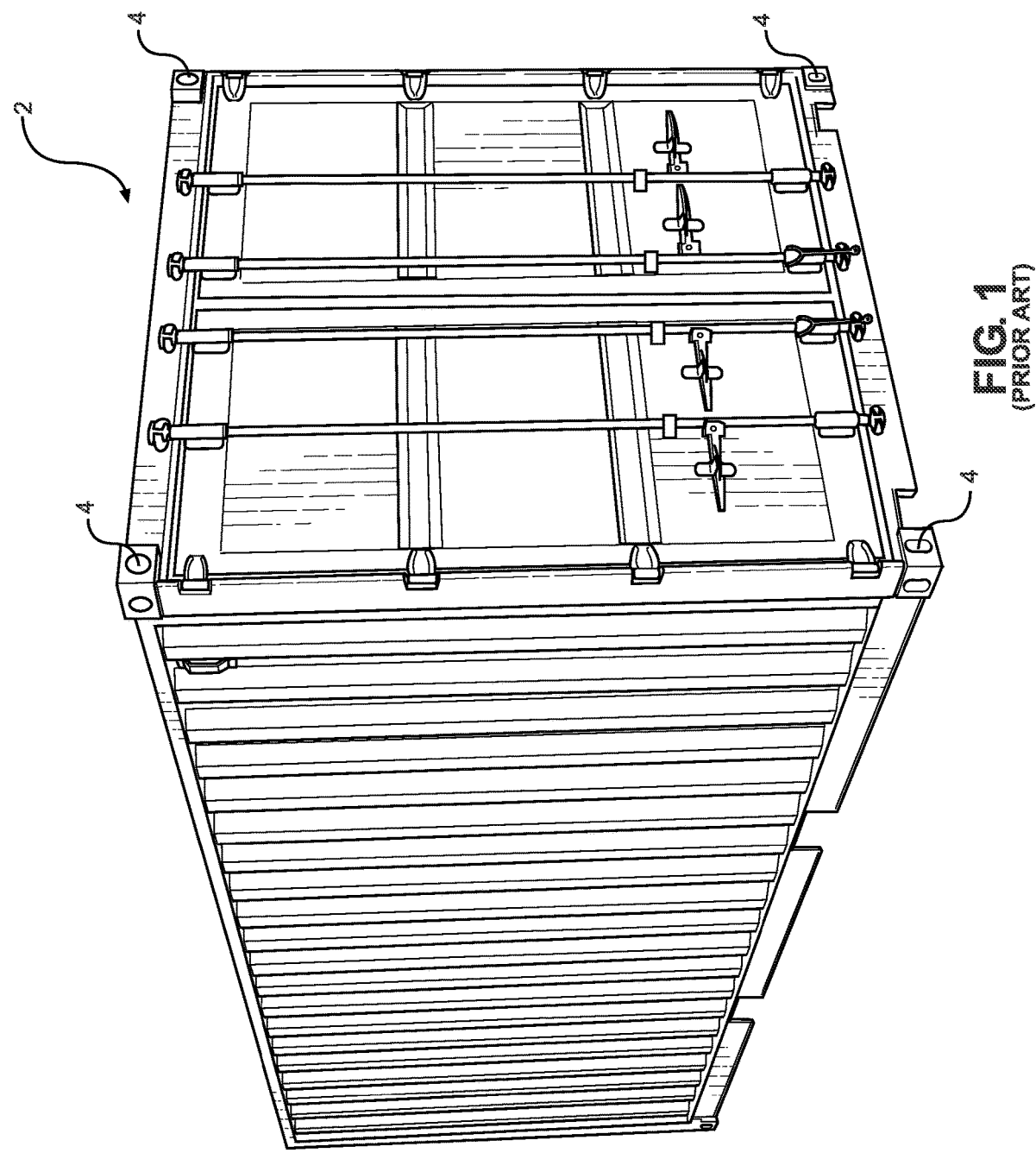
FIG. 1 is a view in perspective illustrating a prior art ISO container.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

Figure 3:
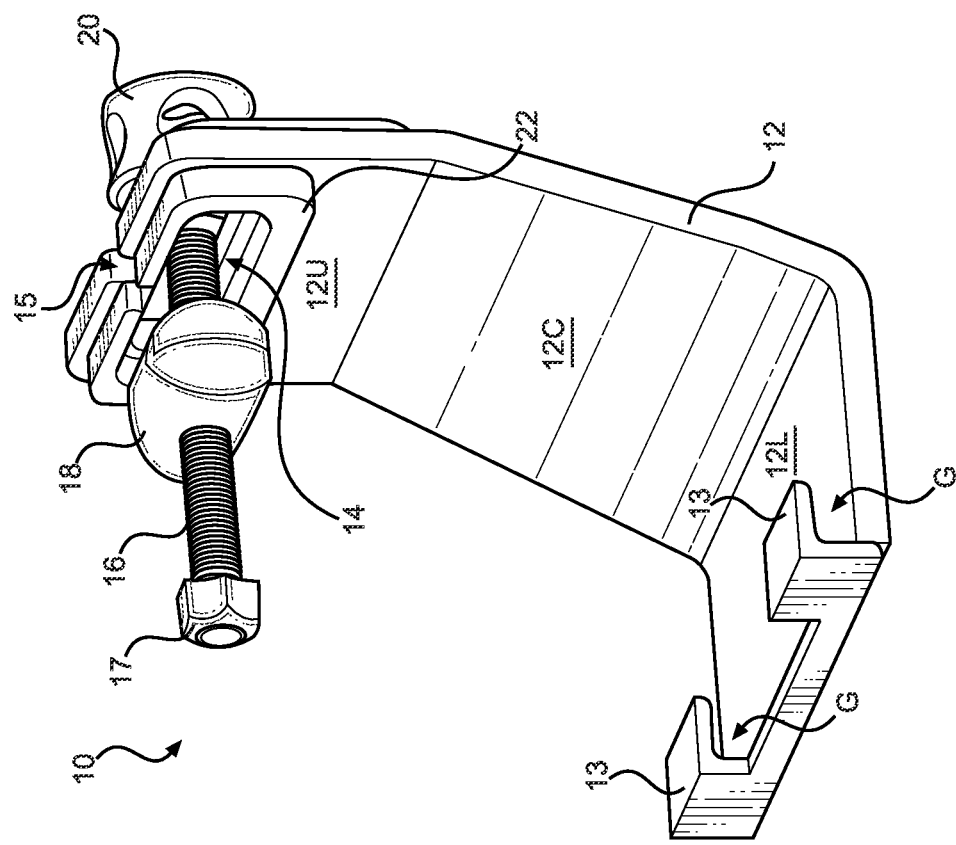
FIG. 3 is a view in perspective illustrating an embodiment of the present invention.

U.S. Provisional Application No. 63/017,201 filed Apr. 29, 2020 is hereby incorporated by reference An embodiment of a fastener 10 for fastening an ISO container to a supporting structure is shown in FIG. 3. The supporting structure may be a trailer, a railcar, a truck, a ship, another ISO container or any other structure to which ISO containers are attached for transport, storage, manufacture, repair or any other reason. Except where noted otherwise, the fastener 10 is made of steel, aluminum or other similarly strong materials as will be understood from the description herein by a person of ordinary skill. Except where noted otherwise, all orientations of a container referenced herein are as shown in FIG. 1, which is the upright orientation used for shipping.

Figure 2:
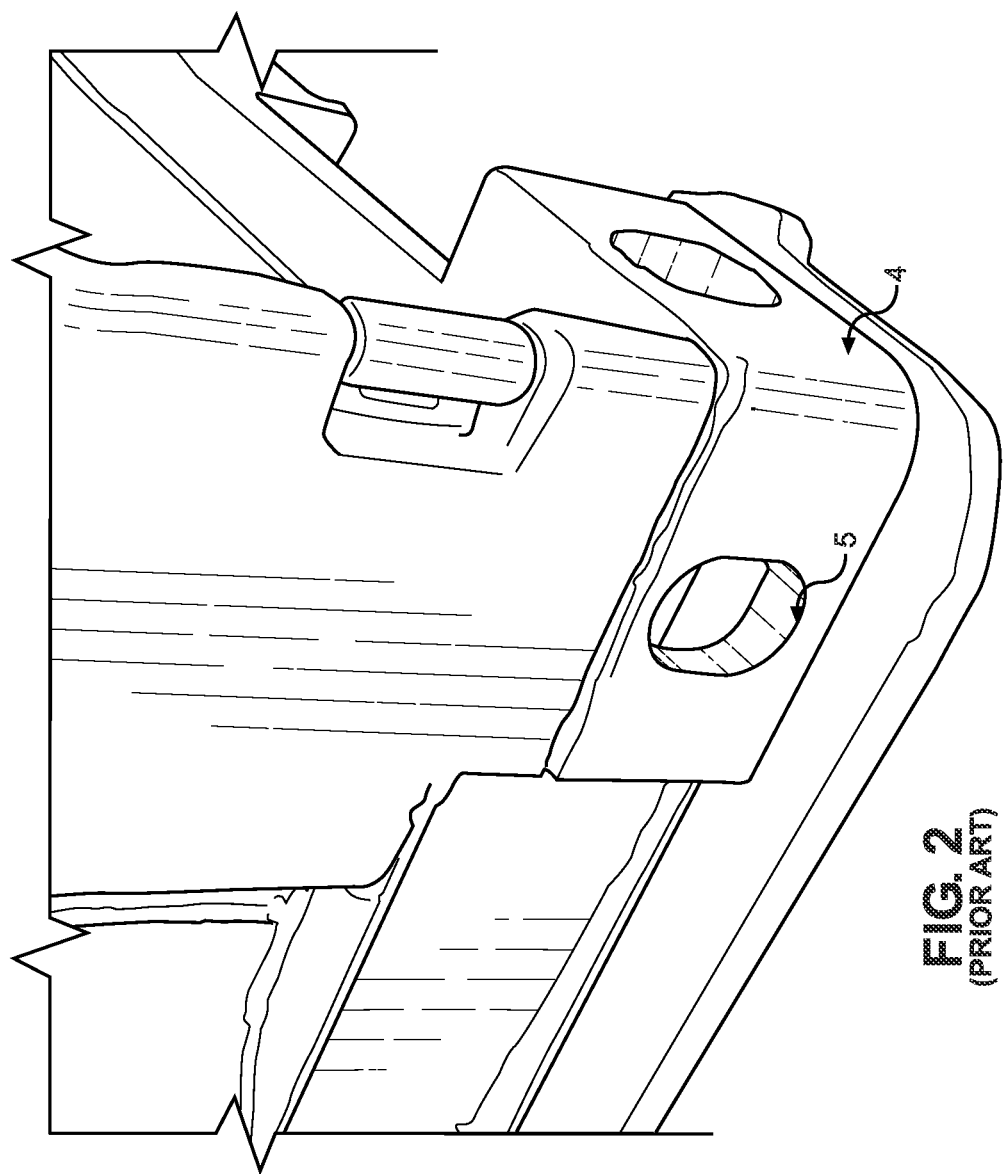
FIG. 2 is a view in perspective illustrating a prior art ISO container's corner casting.

The fastener 10 has an oblong portion that inserts into the container 2. The oblong portion may be the elongated nut 18, which has a threaded aperture 18' (FIG. 11) extending perpendicular to the longer dimension of the nut 18. The elongated nut 18 has a longitudinal axis aligned with the length of the nut 18, even though the nut 18 is not symmetrical around the longitudinal axis. The elongated nut 18 is longer than the width of the corner casting aperture 5 when the container is in the normal orientation shown in FIGS. 1-2, and the nut 18 is no longer than the height of the aperture 5. This permits the nut 18 to be inserted in the aperture 5 in at least one orientation, and prevents the nut 18 from being inserted or removed through the aperture 5 in at least one other orientation. A threaded shaft 16 may be inserted through the aperture 18' to firmly retain the nut 18 in longitudinal position along the shaft 16, but permit movement of the nut 18 along the shaft 16 by relative rotation.

Figure 5:
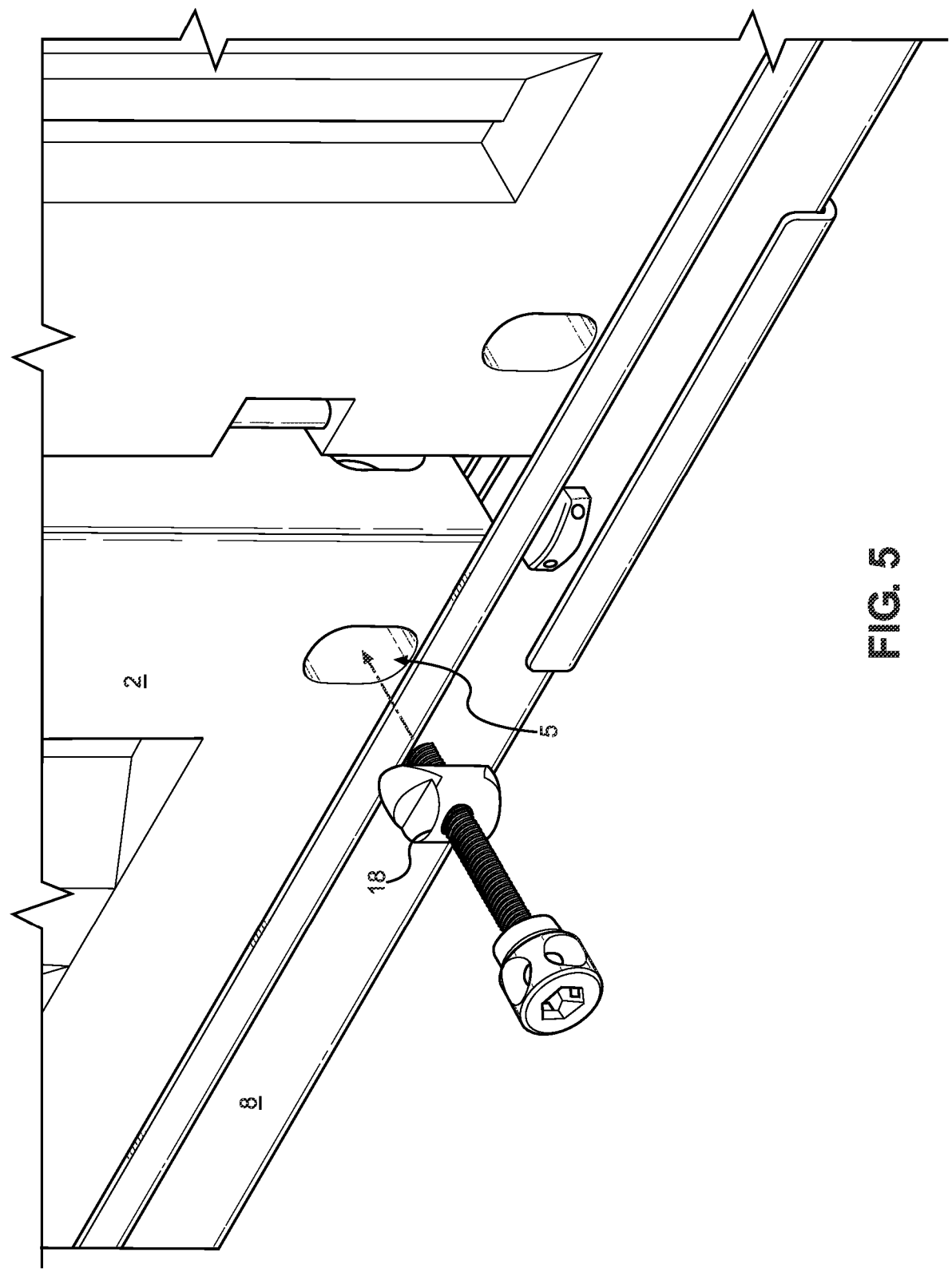
FIG. 5 is a view in perspective illustrating the embodiment of FIGS. 3-4 during a process of being installed on a conventional ISO container.
Figure 13:
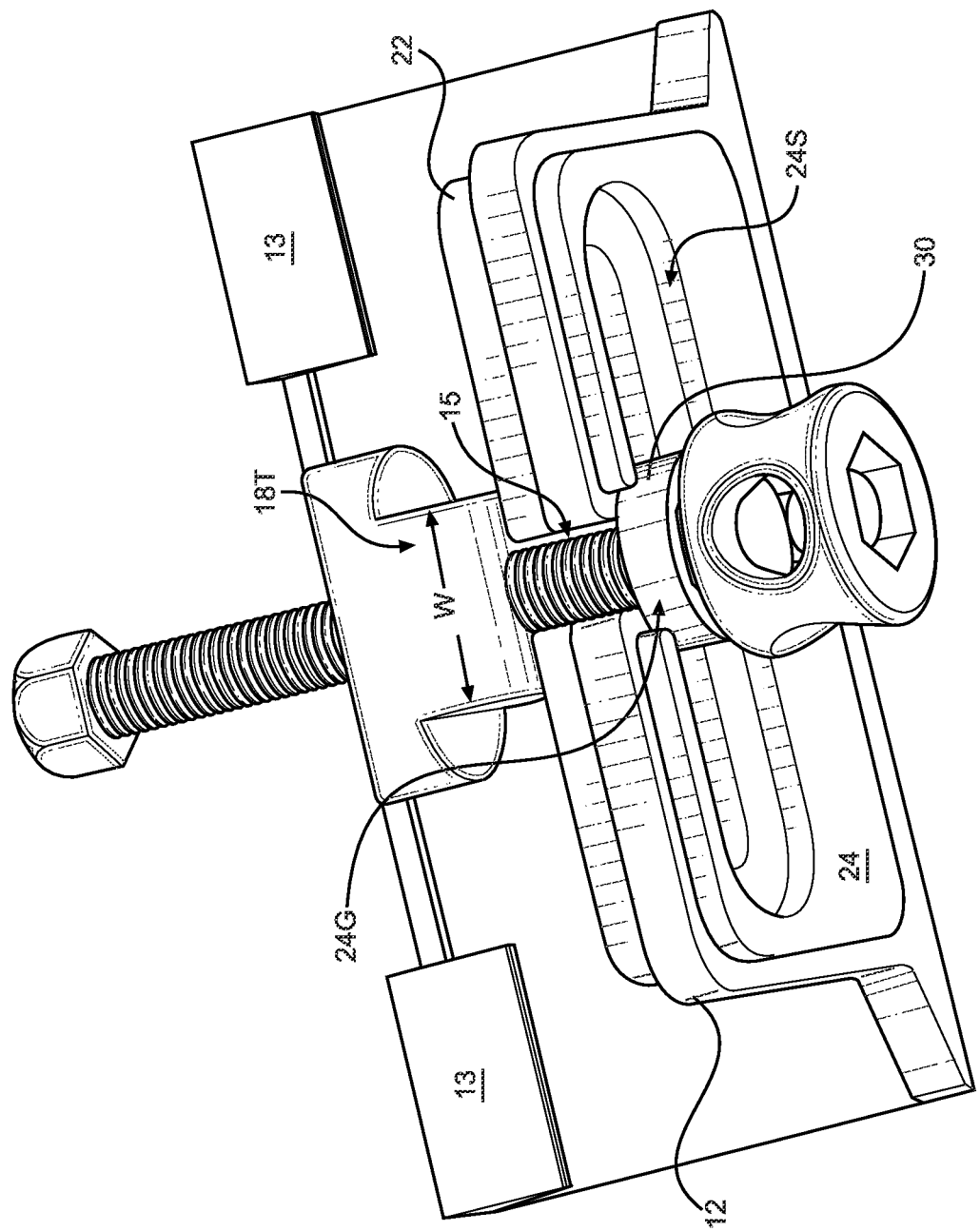
FIG. 13 is a view in perspective illustrating the embodiment of FIGS. 3-4.
Figure 15:
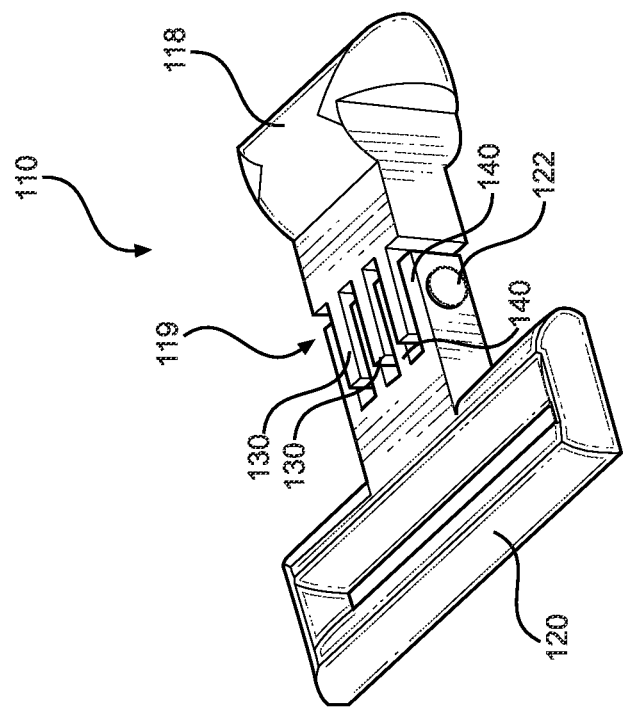
FIG. 15 is a view in perspective illustrating the embodiment of FIG. 14.
Figure 14:
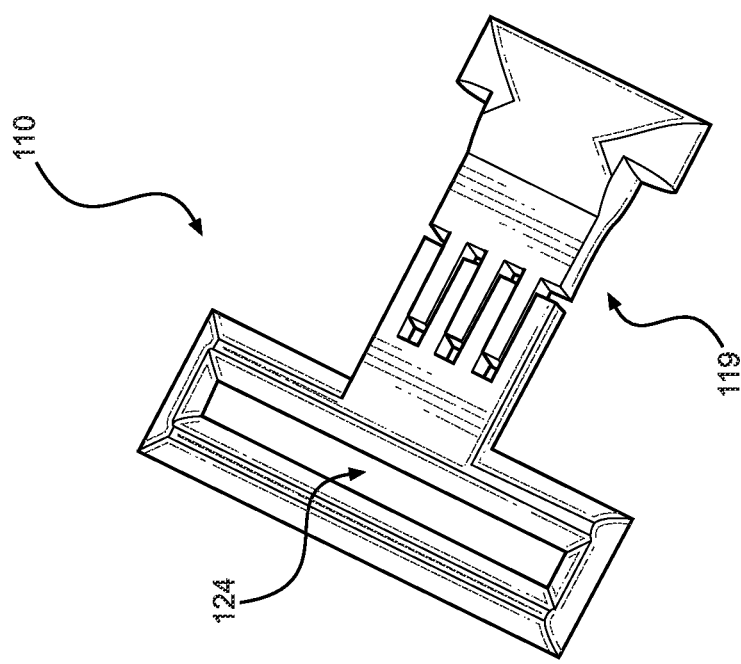
FIG. 14 is a view in perspective illustrating an alternative embodiment of the present invention.

The fastener 10 has a lock plate 12 that attaches to the trailer, ship, truck or other structure 8 that the ISO container 2 rests on as shown in FIGS. 5, 13 and 14. The plate 12 may attach to the structure 8 by any fastening system, such as screws, rivets, adhesive, weldments and a similar nut and shaft inserted into an aperture in the structure 8. However, it is preferred that the fastening system may be quickly fastened and unfastened, and most preferably by the hands of a human user with a minimum of tools. Furthermore, once the plate 12 is attached to the container 2 and the structure 8 upon which the container 2 rests, separation of the container from the structure 8 is prevented other than by breaking the fastener 10 or deliberately removing the fastener 10. The former is almost always prevented because the fastener 10 is made of very strong materials. The latter is readily accomplished using no, or readily available, tools.

The plate 12 may have multiple panels or portions angled or shaped in order to best accommodate attachment to a particular structure 8. The plate 12 may be generally J-shaped when viewed from the side, as in FIG. 3. A lower panel 12L is angled relative to a central panel 12C and an upper panel 12U. The panels may be bent or otherwise shaped to form the plate 12. An alternative panel may be gently curved and not have distinct bends between panels as with the plate 12.

In the embodiment shown, the lower panel 12L has at least one, and preferably multiple, hooks 13 that extend over the lower panel 12L in the orientation of FIG. 3. The hooks 13 are spaced from the lower panel 12L by one or more gaps G. The central panel 12C extends from the lower panel 12L at an angle, such as about 110 degrees, and terminates in an upper panel 12U that is angled relative to the lower panel 12L by about 90 degrees. In alternative embodiments, the plate 12 may be curved gently between the lower panel and the upper panel without a distinct bend, such as by a single, larger radius curvature. The plate 12 shown attaches to conventional structures to which ISO containers are commonly mounted, such as trucks, trailers and railcars, as described herein.

The upper panel 12U of the lock plate 12 has a horizontally-oriented (in the orientation of FIG. 3) slot 14 with a vertically-oriented (in the orientation of FIG. 3) gap 15 near the middle of the slot 14. The slot 14 and gap 15 are at least as wide as the shaft 16 to permit insertion of the shaft 16 therein and movement along each. The shaft 16 may have a conventional hex nut 17 threaded on one end and the elongated nut 18 is preferably threaded between the hex nut 17 and the opposite shaft 16 end. A tie down winch end cap, also known as a pipe ring 20, is mounted on the opposite end of the shaft 16 so that the ring 20 does not move relative to the shaft 16. The ring 20 is larger than the width of the slot 14 to prevent passage of the ring 20 through the slot 14. A user may rotate the shaft 16 by rotating the ring 20 by hand, by inserting a pin through the radial openings in the ring 20 and rotating the ring 20 by rotating the pin, and/or by inserting a tool into the end/axial opening and rotating the ring 20. By rotating the ring 20, the shaft 16 is thereby rotated.

In one embodiment, the fastener 10 is attached to a container 2 and the structure 8 upon which the container 2 rests by the user first orienting the nut 18 with its longest dimension orientated vertically, as shown in FIG. 5. In this position, the nut 18 is aligned with the longest dimension of the corner casting aperture 5, which is the vertical spacing between the top and bottom of the aperture 5. The nut 18 is then inserted through the aperture 5 (FIGS. 5-6) by displacing the shaft 16 axially, which can be accomplished by a user with his or her hands, or may be performed by a machine.

Figure 6:
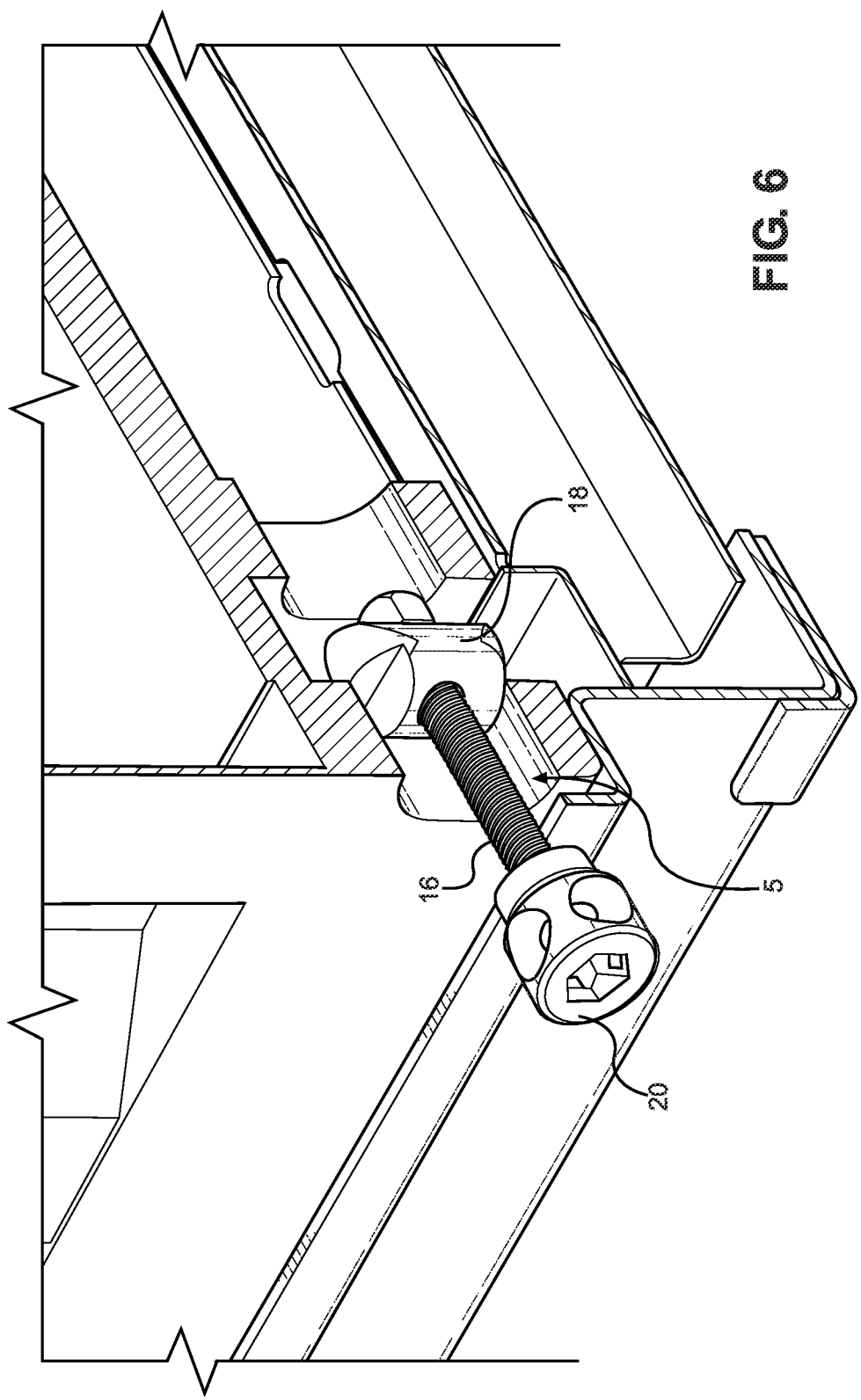
FIG. 6 is a section view in perspective illustrating a subsequent step to FIG. 5 in the installation process.
Figure 7:
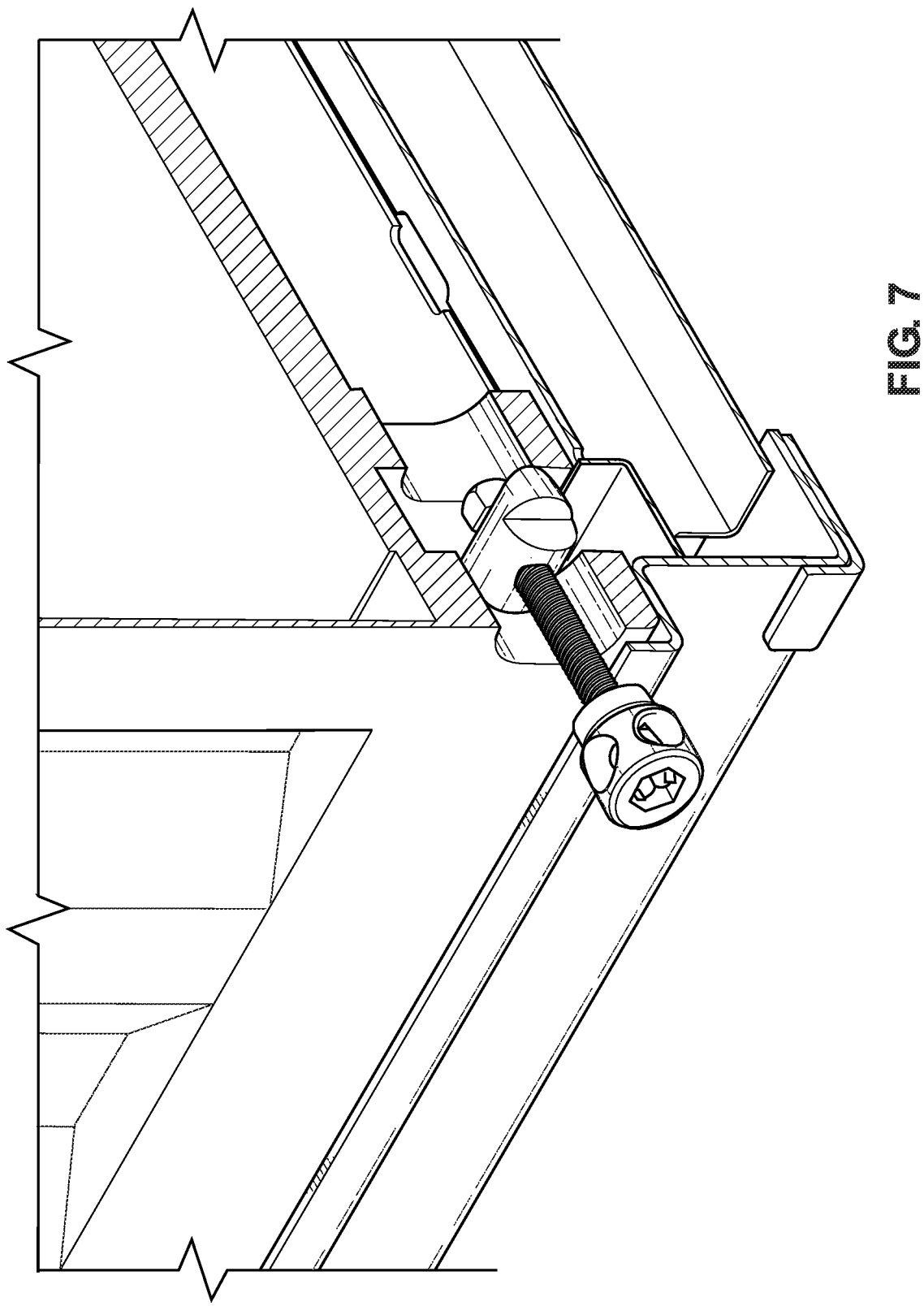
FIG. 7 is a section view in perspective illustrating a subsequent step to FIG. 6 in the installation process.

Once the nut 18 has passed through the aperture 5 to the position shown in FIG. 6, the user rotates the ring 20, which rotates the shaft 16. Furthermore, if the nut 18 is a sufficient distance past the structures that define the aperture 5 and would otherwise interfere with the rotation, the nut 18 is rotated to an approximately horizontal orientation as shown in FIG. 7. Even though the shaft 16 and the nut 20 may be moved relative to one another by hand or otherwise, extending the nut 18 far enough into the aperture will position the nut 18 out of range of contact during rotation with any structures that would resist rotation of the nut 18 when the shaft 16 is rotated, and thereby allows the user to rotate the shaft 16 and the nut 18 simultaneously. The friction between the threaded surfaces is sufficient, if there is no substantial resistance to rotation of the nut 18, to cause the nut 18 to rotate when the shaft 16 is rotated. Once the nut 18 is horizontal, the nut 18 may not be removed from the corner casting by reversing the axial movement without further rotation of the nut 18 to align vertically with the aperture 5. This is because the length of the now horizontal nut 18 is greater than the width of the aperture 5. In the horizontal nut 18 orientation shown in FIG. 7, the length of the nut 18 is greater than the width of the aperture 5, thereby preventing withdrawal of the nut out of the aperture 5 without rotation of the nut 18 about 90 degrees.

Figure 4:
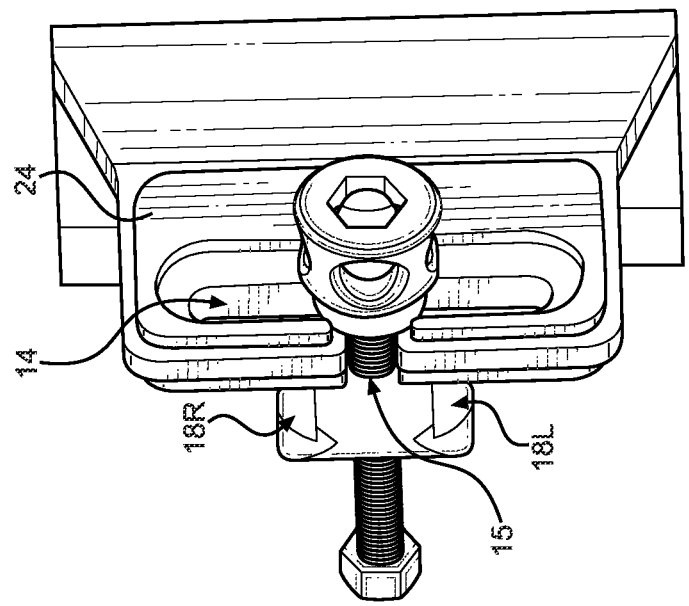
FIG. 4 is a view in perspective illustrating the embodiment of FIG. 3 from a front side.

Once the nut 18 is in the horizontal position in the corner casting 4, the ring 20, shaft 16 and nut may then be displaced as a unit away from the container along the axis of the shaft 16 until the portion of the nut 18 facing outwardly of the container seats against the inner surface(s) of the structure(s) that define the aperture 5. As shown in FIG. 4, there are two recesses 18L and 18R formed on opposite sides of the nut 18, which are spaced a distance, W (FIG. 13) that is no wider than the width of the aperture 5. The recesses 18L and 18R define an insert portion 18T of the nut 18 with a width of W, which is preferably slightly less than the width of the aperture 5. Thus, when the horizontal nut 18 is displaced outwardly of the container along the shaft 16 shown in FIG. 7, the insert portion 18T extends into the aperture 5, so that the recesses 18L and 18R face the sides of the aperture 5. Once the nut 18 is in this position, if the shaft 16 is rotated, the nut 18 will not rotate substantially, because slight rotation will cause the sidewalls of the insert portion 18T to contact the walls defining the aperture 5 and rotate no farther. The aperture sidewalls serve as a "wrench" to prevent rotation of the insert portion 18T of the elongated nut 18 when the shaft 16 is rotated.

Figure 8:
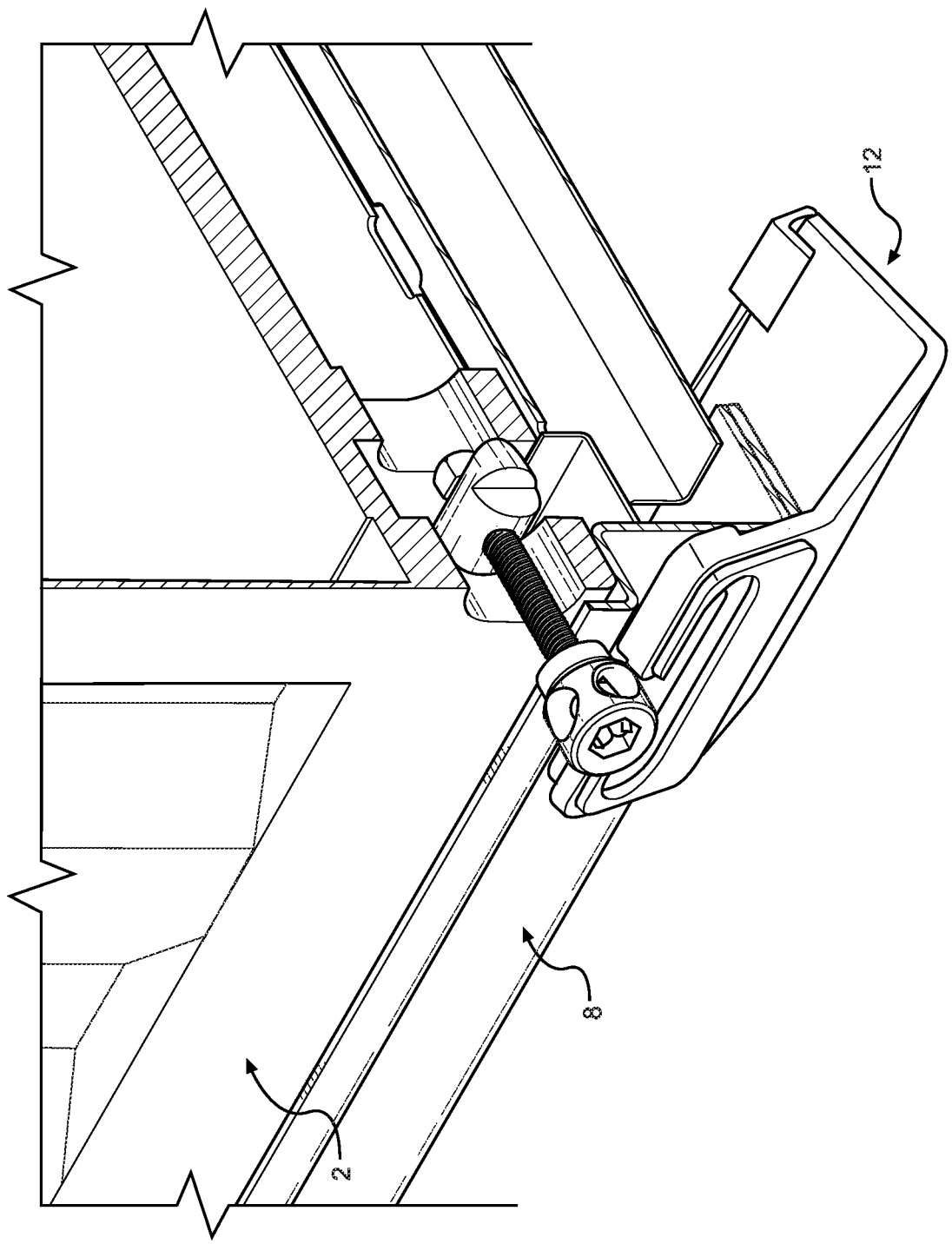
FIG. 8 is a section view in perspective illustrating a subsequent step to FIG. 7 in the installation process.
Figure 9:
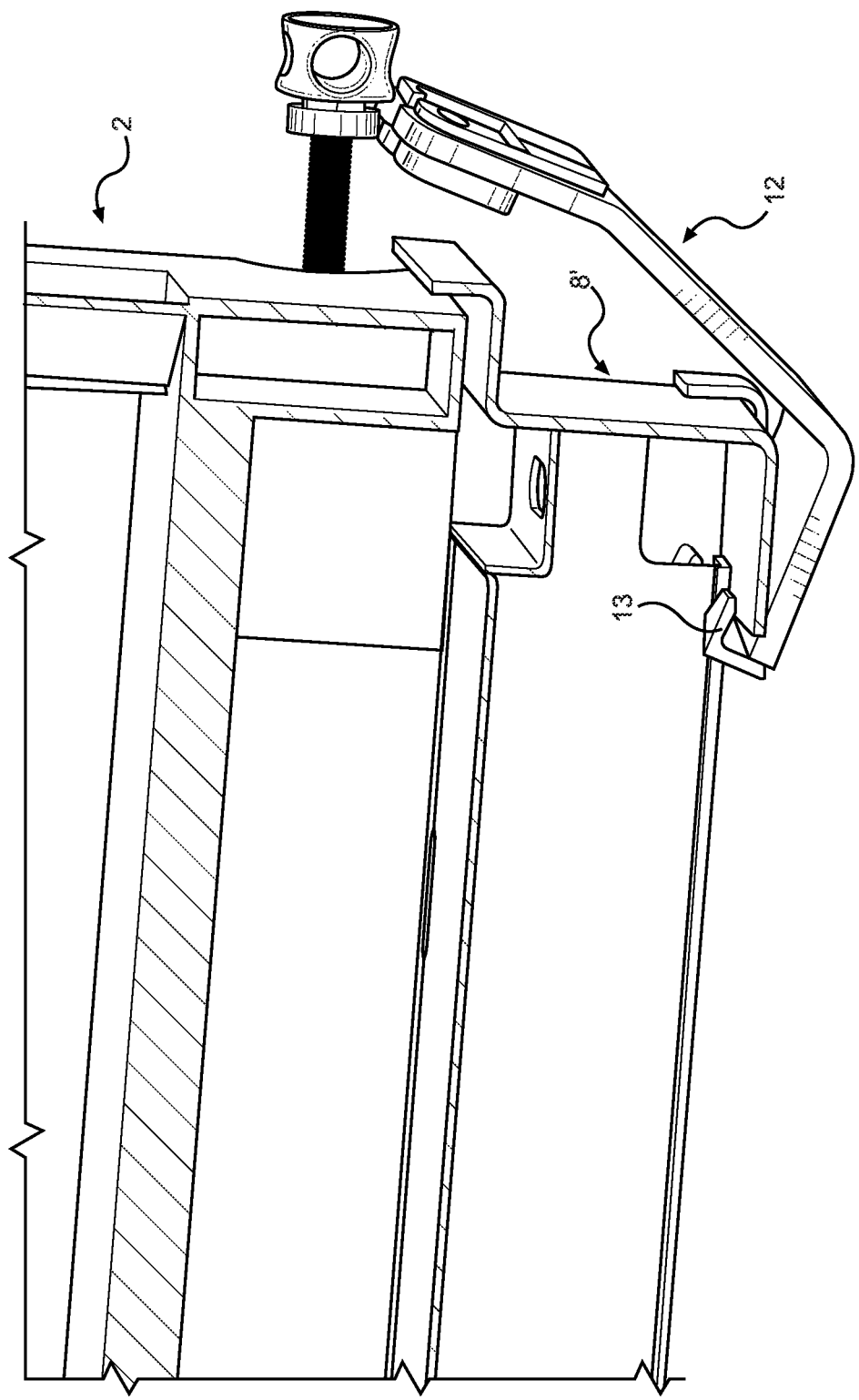
FIG. 9 is a section view in perspective illustrating the step of FIG. 8.
Figure 10:
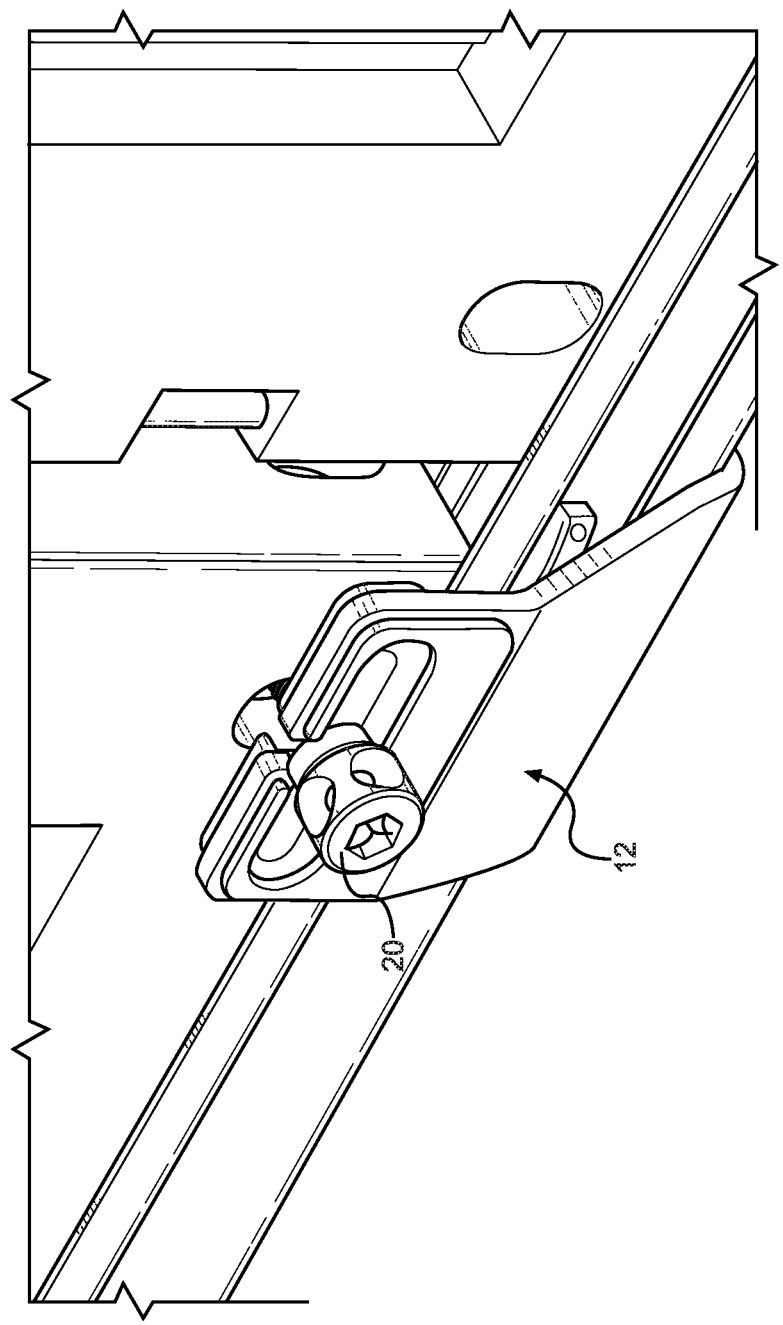
FIG. 10 is a section view in perspective illustrating a subsequent step to FIG. 9 in the installation process.

The user next extends a portion of the lock plate 12 under the structure 8 (FIGS. 8-9). This may extend the hooks 13 around a framework portion of the structure 8, such as an edge of a rail 8' of the structure 8 as shown in FIG. 9. The rail 8' has a substantially horizontal flange that may thus be positioned partially in the gap(s) G. With the rail 8' flange in the gaps G, the plate 12 is restrained from moving in at least one direction (outwardly of the container, which is laterally to the right in FIG. 9) due to the hooks 13 extending around the rail 8'. Once the lower end of the plate 12 is hooked to the rail 8', the upper portion of the plate 12 is pivoted upwardly about the hooks 13 toward the container 2 from the position shown in FIG. 9 until the shaft 16 extends through the gap 15 and into the slot 14. This is the position shown in FIG. 10 and shown in FIG. 13 with the structure 8 and ISO container 2 omitted for greater visibility of the fastener 10.

The ring 20 is next rotated in one direction, thereby rotating the threaded shaft 16 relative to the nut 18, to bring the ring 20 closer to the nut 18 on the shaft 16 by threading the shaft 16 further past the nut 18. The ring 20 is larger than the width of the slot 14 and the gap 15, and so the ring 20 functions in the manner of a bolt head and remains in the slot 14 while the ring 20 rotation draws the plate 12 tightly against the container 2 to the position shown in FIGS. 11 and 12. Rotation of the shaft 16 further seats the nut 18 against the inner surface of the corner casting 4, thereby clamping the sidewall of the corner casting 4 and the plate 12 tightly between the ring 20 and the nut 18, as shown in FIG. 11.

As shown in FIGS. 3-4, a front lock plate 24 and a rear lock plate 22 are mounted, such as by welding, to opposite sides of the upper panel 12U, to reinforce the lock plate 12 where the force of the ring 20 tightening the nut 18 is applied, and to limit movement of the shaft 16 after tightening. The front lock plate 24 and the rear lock plate 22 have openings that are larger than the widths of the slot 14 and the gap 15 to keep the lock plates 22 and 24 from interfering with the insertion or movement of the shaft 16. Furthermore, as shown in FIGS. 4 and 13, the front lock plate 24 has a slot 24S that is at least as large as the outer diameter of a washer 30 that is mounted on the shaft 16 between the ring 20 and the nut 18, and a gap 24G that is smaller than the outer diameter of the washer 30. When the shaft 16 is first extended through the vertical gap 15 in the lock plate 12 and the ring 20 is rotated to bring the nut 18 closer to the ring 20, the washer 30 is displaced axially into the slot 24S and seated against the plate 12 as shown in FIG. 13. Thereafter, the washer 30 cannot be moved out through the slot 24G, and the shaft 16 to which the washer 30 is mounted cannot be moved out through the gap 15, without first rotating the ring 20 in the reverse direction to move the ring 20 axially away from the nut 18. This is because the opposing surfaces of the front lock plate 24 that define the gap 24G are closer than the outer diameter of the washer 30.

Figure 11:
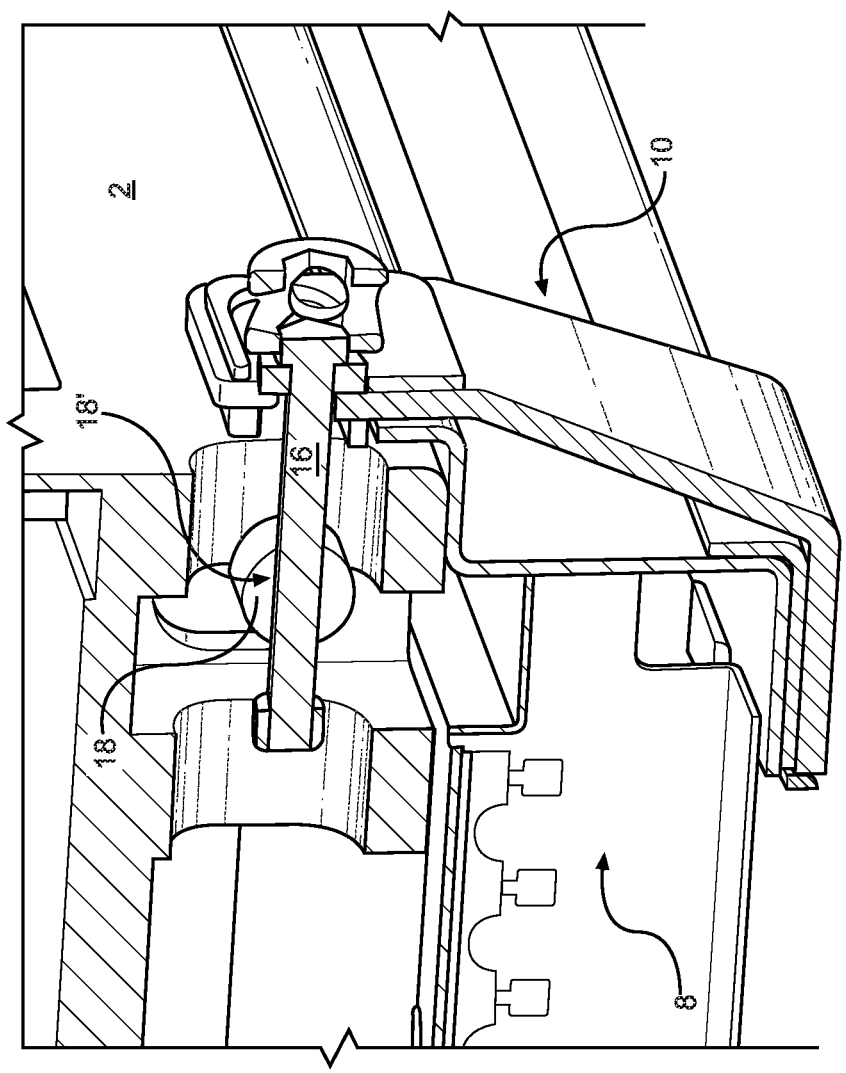
FIG. 11 is a section view in perspective illustrating the embodiment of FIGS. 3-4 in a final position.
Figure 12:
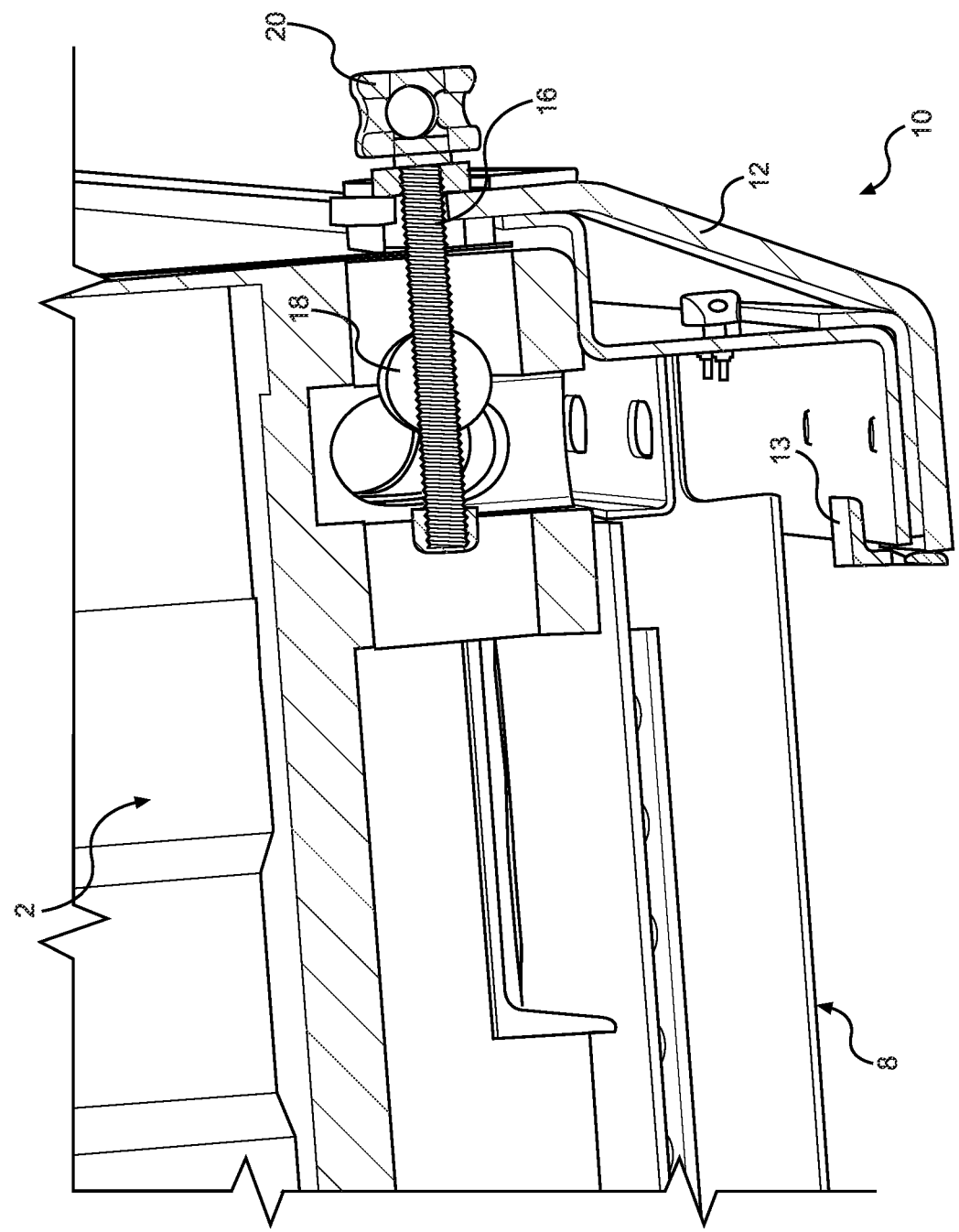
FIG. 12 is a section view in perspective illustrating the embodiment of FIGS. 3-4 in a final position.

Once the fastener 10 is positioned as shown in FIGS. 11 and 12, the fastener 10 is firmly attached to the structure 8 and to the container 2. Because the fastener 10 is made of a strong material, it will prevent any substantial movement of the container 2 relative to the structure 8. It is preferred that a similar fastener be similarly mounted to the structure 8 at the three remaining lower corner castings of the container 2. Once four such fasteners are mounted in this manner at all four bottom corners, it will become apparent that the container 2 will not readily be separated from the structure 8 without removing the fasteners in the reverse order in which they were installed.

Figure 26:
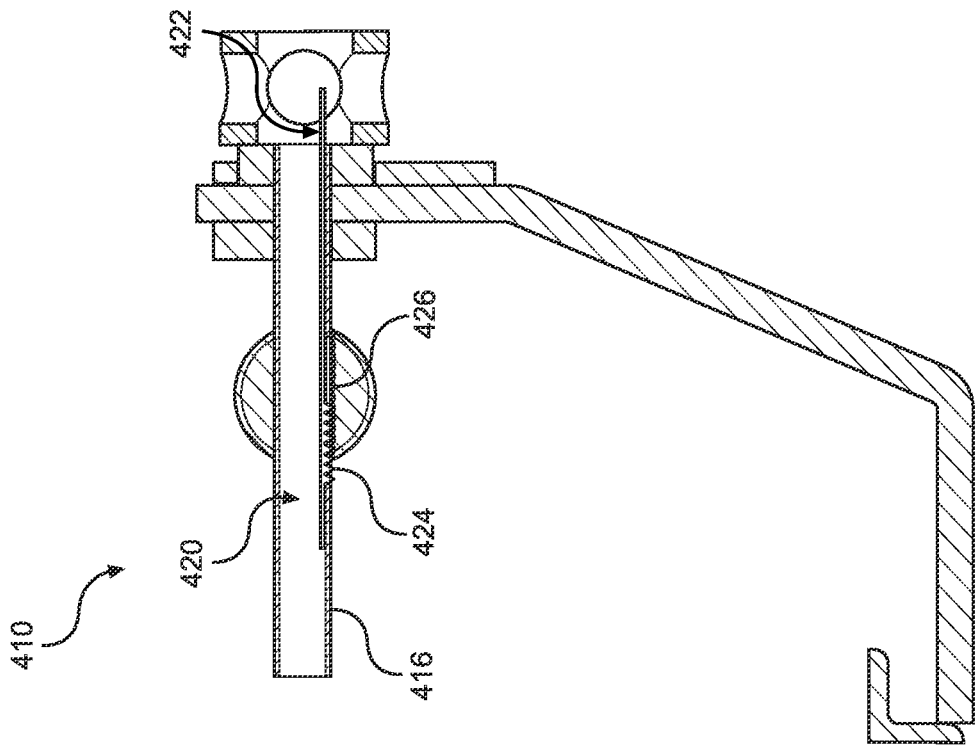
FIG. 26 is a side view in section of the embodiment of FIG. 25 through the line 26-26.
Figure 25:
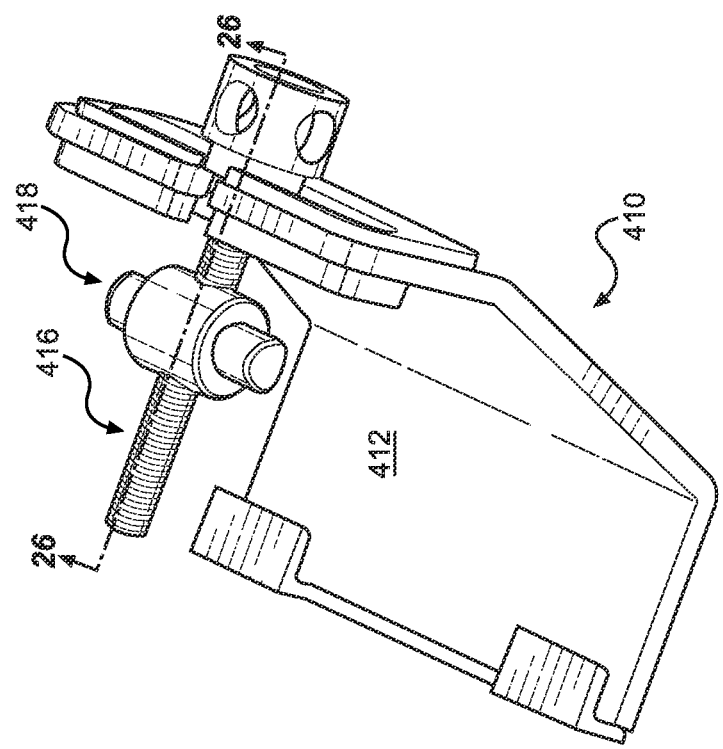
FIG. 25 is a view in perspective illustrating an alternative embodiment of the invention.

In alternative embodiments, instead of being threaded, the nut and shaft may be otherwise configured. In the embodiments described above, the elongated nut is configured to be moved longitudinally on the shaft to clamp the plate and corner casting sidewall and be locked in place. And those embodiments are configured for the nut to be moved longitudinally when the fastener needs to be removed from the container and/or supporting structure. A contemplated alternative fastener 410 is shown in FIGS. 25 and 26. The elongated nut 418 has a ratchet mechanism 420 to lock and release the nut 418 to the shaft 416 rather than a threaded nut and shaft as in the fastener 10. A movable strip 422 within the hollow passage of the shaft 416 has one or more pawls 424 that extend radially through openings to insert into corresponding, radially inwardly facing teeth 426 formed on the nut 418. The nut 418 is moved to the right in FIG. 26 to seat against the sidewall of a corner casting (not shown) and lock the nut 418 and shaft 416 together in the position shown. When it is time to remove the fastener 410, the pawls 424 are withdrawn from the teeth 426 by displacing the strip 422 upwardly (in the orientation of FIG. 26) away from the teeth, and the shaft 416 may then slide relative to the nut 418.

Any other alternative may be substituted for the threaded or ratchet mechanisms. A split nut mechanism, as may be found on workbench vises, can also be used to give features of a screw and nut configuration combined with a ratchet mechanism. Any mechanism is contemplated that permits tightening the shaft relative to the nut to mount the plate to the corner casting, and then releasing the mount so that rotation of the nut can occur for removal from the corner casting.

Figure 27:
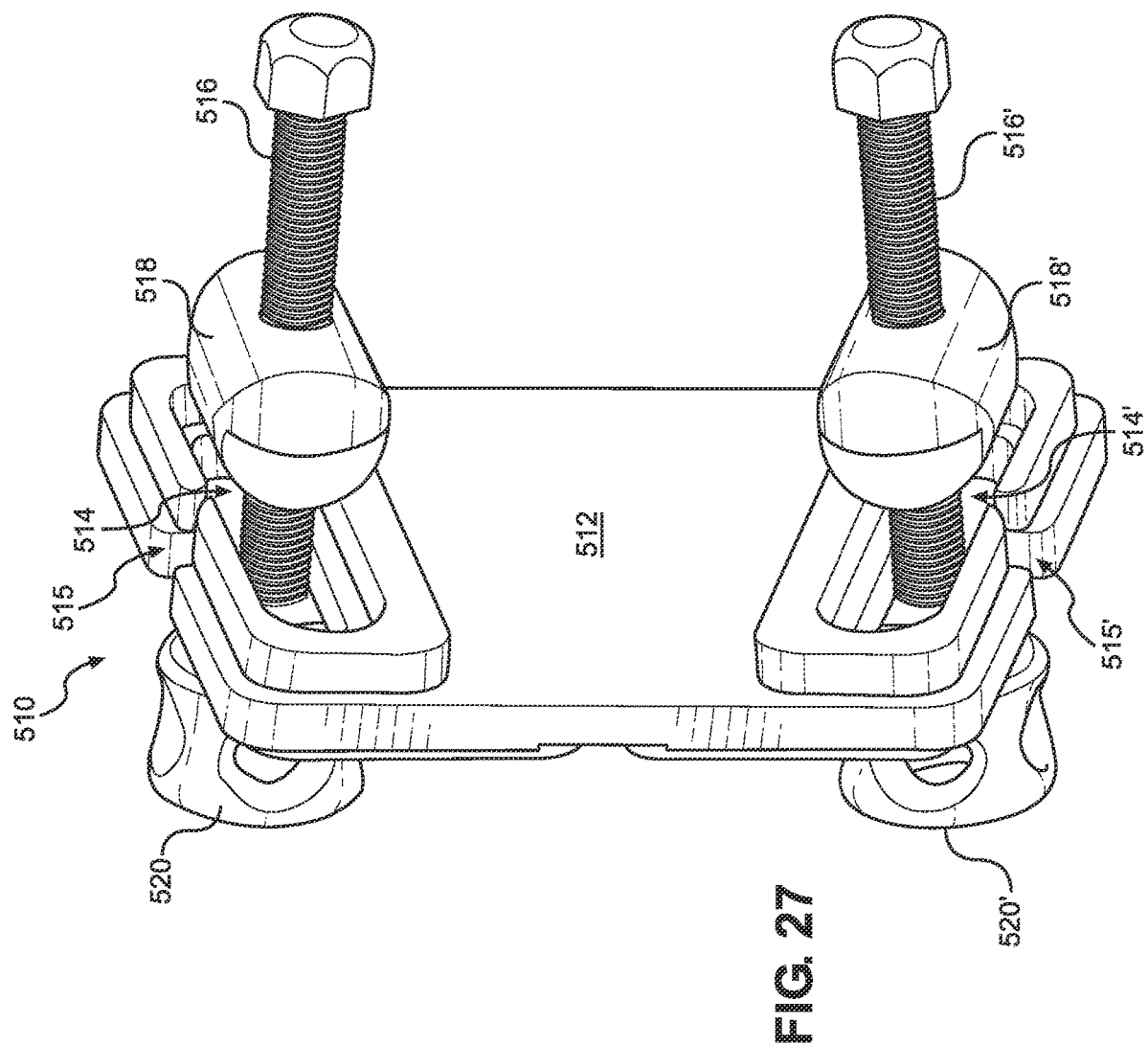
FIG. 27 is view in perspective illustrating an alternative embodiment of the present invention.

In another alternative embodiment shown in FIG. 27, two shafts 516, 516', nuts 518, 518' and rings 520, 520' may be mounted through gaps 514 and 514' in opposite ends of a single plate 512 of a fastener 510. The fastener 510 may be used to fix one ISO container to another ISO container, whether when stacked or end-to-end. The nuts 518 and 518' are mounted in apertures in different corner castings of the ISO containers to fix the ISO containers to one another.

The fastener 110 shown in FIGS. 14-19 is an alternative embodiment. The fastener 110 includes a shaft 119 mounted at one end to an elongated nut 118 and at an opposite end to a loop 120. The loop 120 may have an aperture 124 through which a strap or other tying member may be mounted. The shaft 119 may have a plurality of spaced fingers 130 and a plurality of corresponding spaced fingers 140 that may be interleaved with the fingers 130. An axle 122 may be inserted through aligned holes in the fingers 130 and 140 to form a hinge about which the shaft 119 may pivot.

Figure 16:
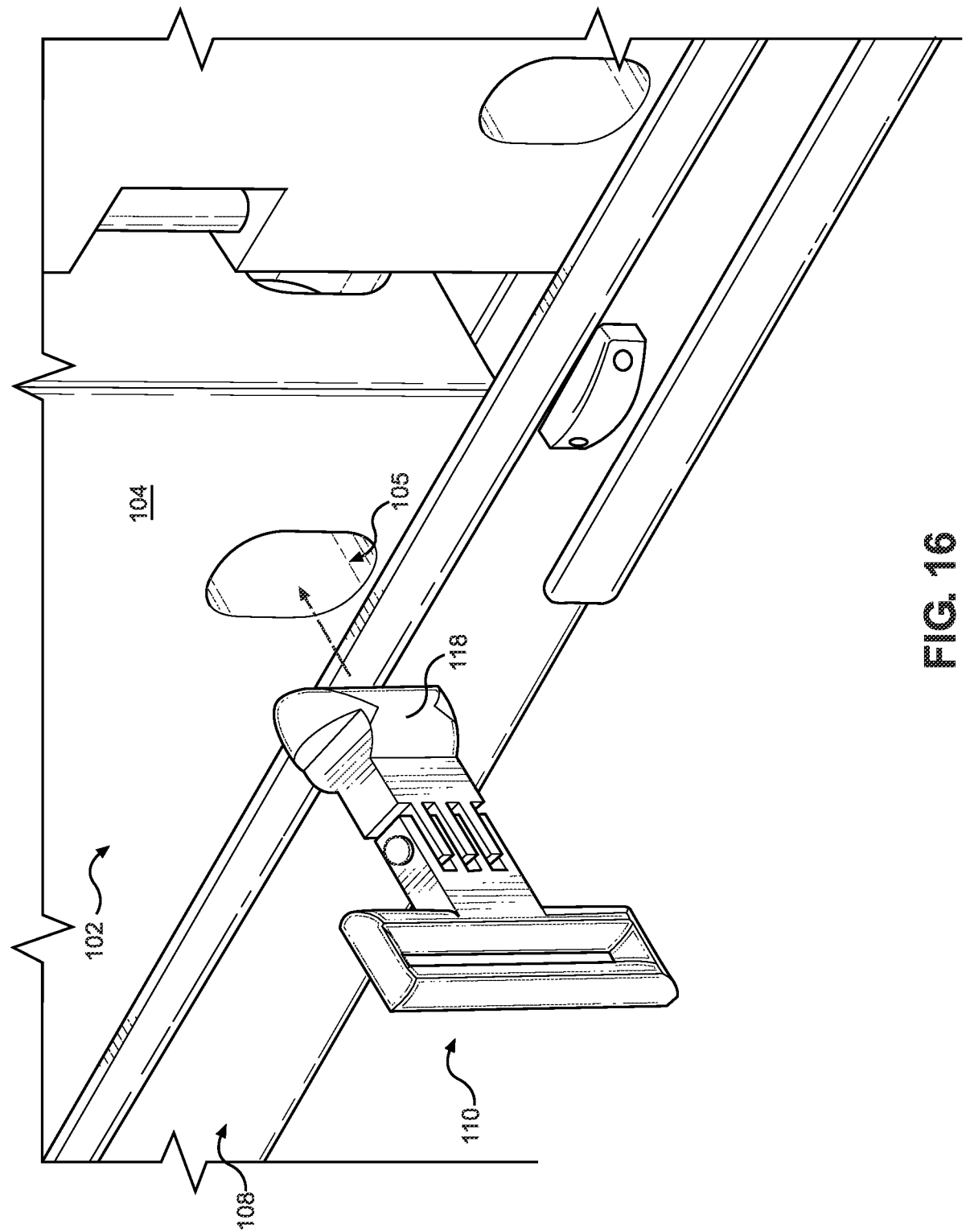
FIG. 16 is a view in perspective illustrating the embodiment of FIGS. 14-15 being installed on a conventional ISO container.
Figure 17:
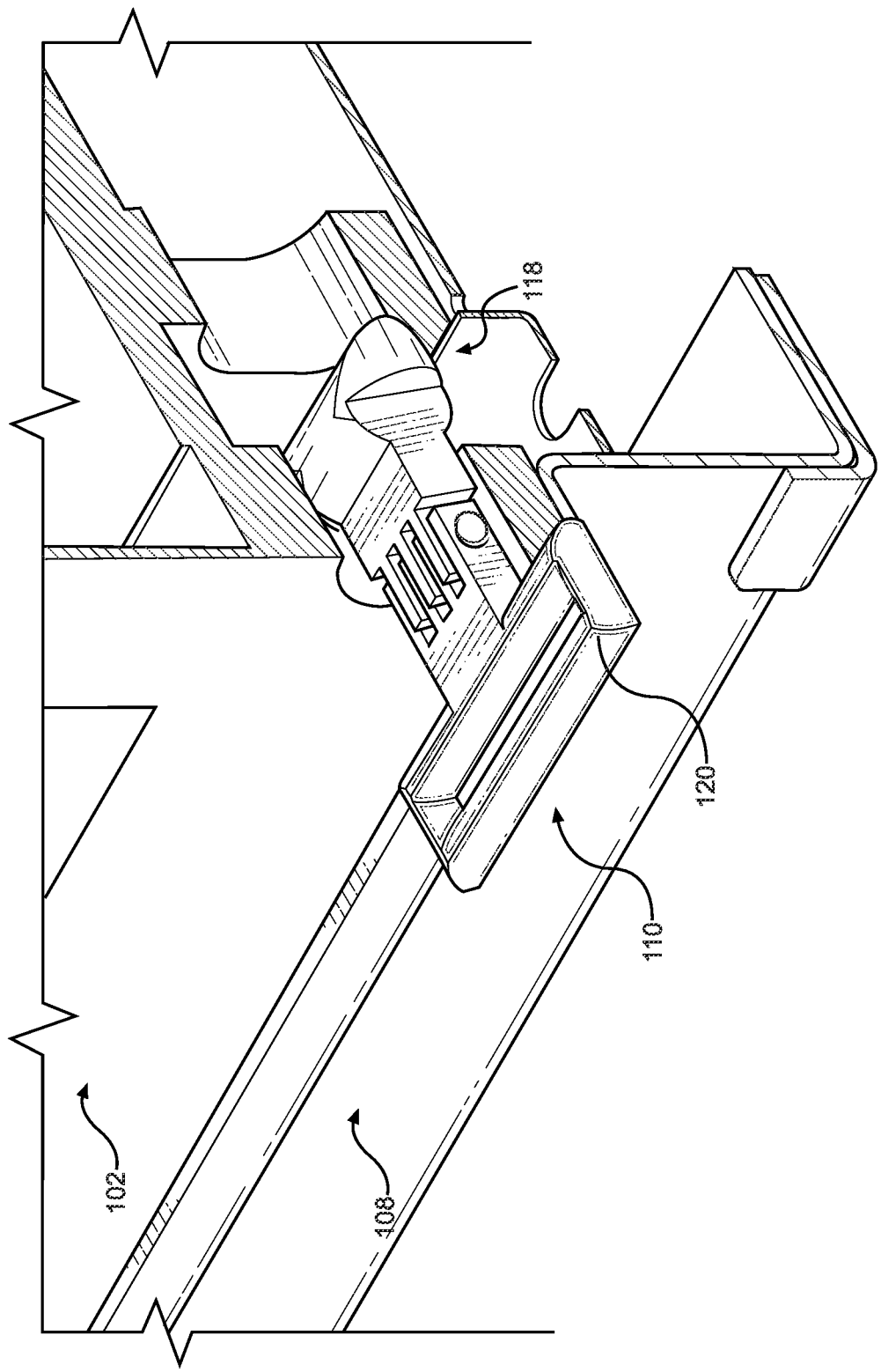
FIG. 17 is a section view in perspective illustrating a step subsequent to FIG. 16 in the installation process.

In order to install the fastener 110 in the container 102, the nut 118 is oriented with its longer dimension oriented vertically and placed adjacent the aperture 105 as shown in FIG. 16. This rotation and the entire installation may be accomplished by hand, but alternatively a machine may be used. The fastener 110 is then displaced axially, along the shaft's longitudinal axis, through the aperture 105 in the corner casting 104. The fastener is then rotated about 90 degrees to horizontal to prevent the nut 118 from coming out of the corner casting 104 without further rotation. The user may grasp the loop 120 with his or her fingers while manually inserting the nut 118 into the corner casting aperture 105 in the manner of a key, and then rotate the loop 120 clockwise by about 90 degrees, which thereby rotates the rigidly-connected nut by about 90 degrees the same direction. The loop 120 is horizontally oriented when the nut 118 is horizontally oriented, as shown in FIG. 17.

Figure 18:
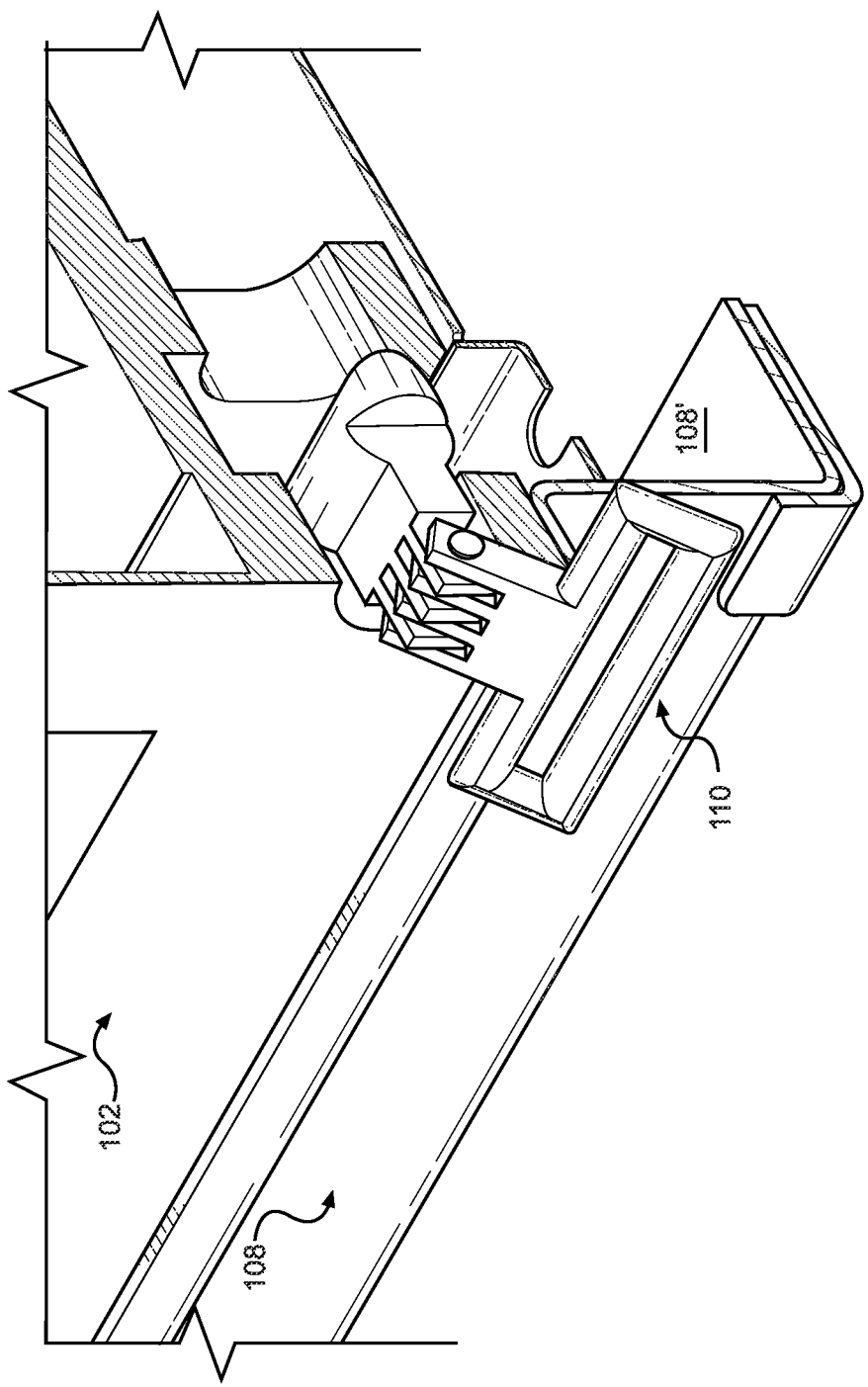
FIG. 18 is a section view in perspective illustrating a step subsequent to FIG. 17 in the installation process.
Figure 19:
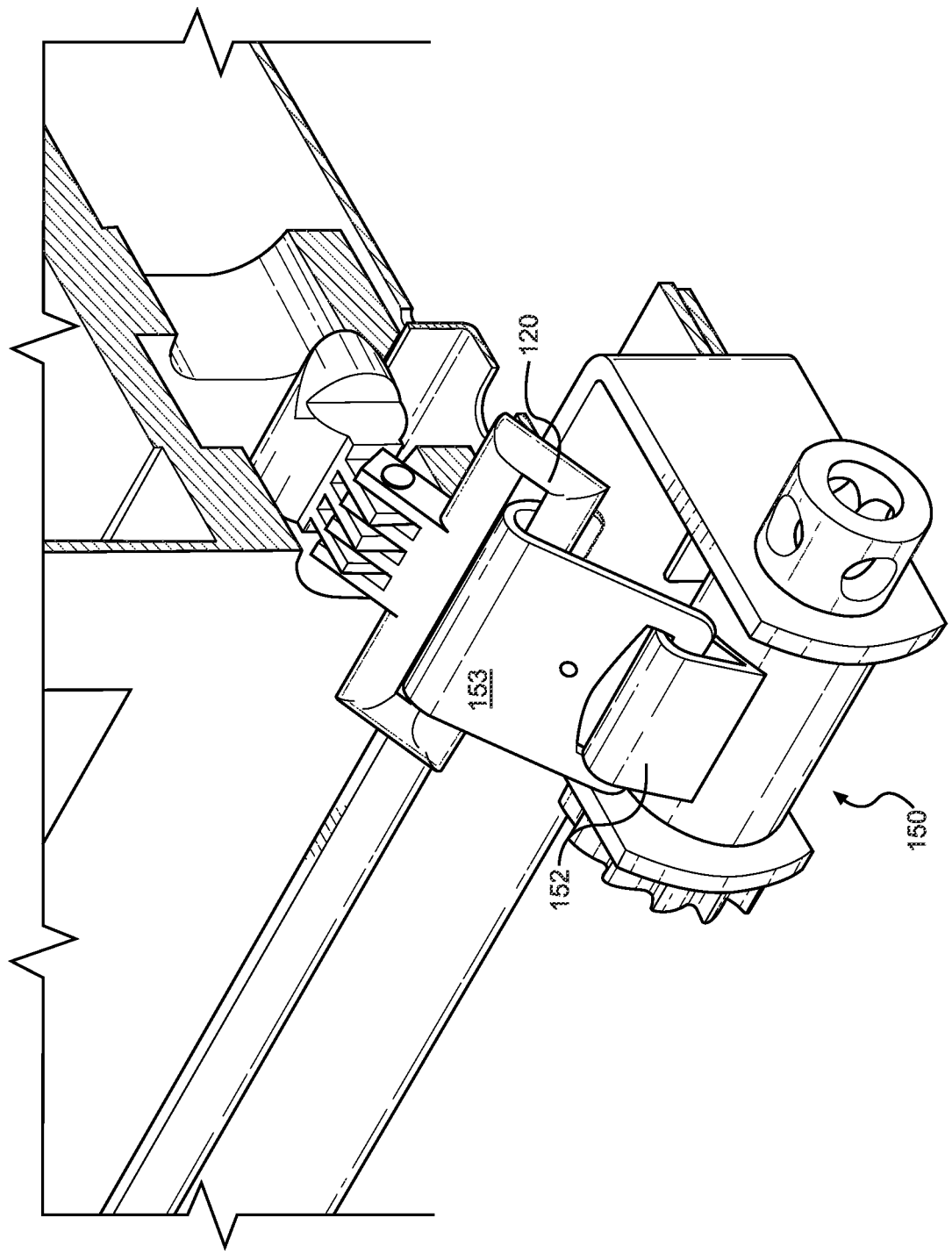
FIG. 19 is a section view in perspective illustrating a step subsequent to FIG. 18 in the installation process, and including a winch and strap.

The shaft 119 may be pivoted about the axle 122, as shown in FIG. 18, to align the shaft portion to which the loop 120 is fixed with the direction of a force that may be applied by a strap 152 that may be attached to the loop 120. The strap 152 (or a hook 153 at the end of the strap 152) may be inserted through the opening 124 of the loop 120, and the strap 152 may be drawn tightly by wrapping the strap 152 around the spool of a winch 150 that is fastened to the side of the structure 108, to which the container 102 is mounted, in a conventional fashion (see FIG. 19). The winch 150 draws the strap 152 tightly in a downward direction, thereby fixing the container 102 to the structure 108 to which the winch 150 is mounted. Alternatively, the strap 152 may have another hook like the hook 153 at the opposite strap end that may be hooked under the rail 108' for attaching the fastener 110 to the structure 108 after being attached to the container 102. Thus, the apparatus 110 described and shown is inserted into the corner casting aperture 105, rotated about 90 degrees and then firmly strapped or otherwise attached to the ship, truck or trailer structure that supports the container. This is preferably repeated at all four corners of the container 102.

Figure 21:
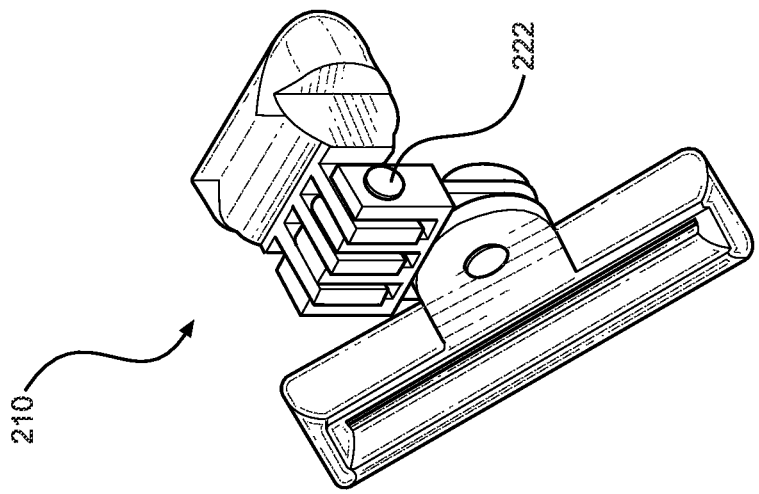
FIG. 21 is a view in perspective illustrating the embodiment of FIG. 20.
Figure 20:
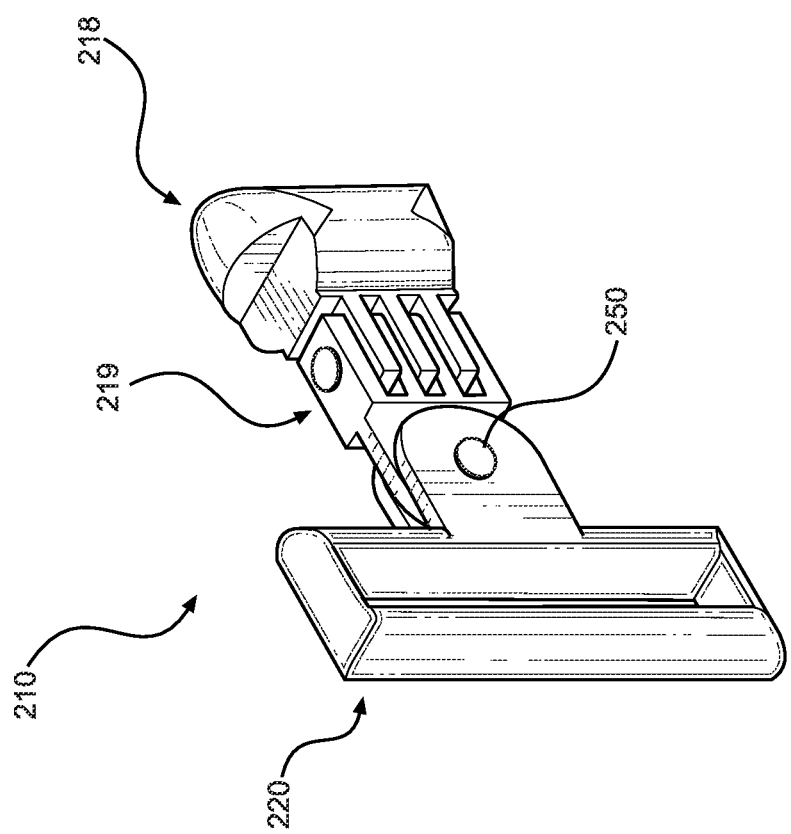
FIG. 20 is a view in perspective illustrating an alternative embodiment of the present invention.

An alternative fastener 210 is shown in FIGS. 20 and 21. The fastener 210 is similar to the fastener 110 shown in FIGS. 14-19 with the addition of a lateral pivot axle 250 on the shaft 219 between the nut 218 and the loop 220. As shown in FIG. 21, the pivot axle 250 permits pivoting along an axis perpendicular to the axle 222. This permits the loop 220 to pivot laterally, in case a strap attached through the loop 220 is fastened to the structure at a position offset from directly below the corner casting. For example, if the winch 150 is attached to the structure further to the left in FIG. 19, the tension of the strap extended through the loop of the fastener 210 would pivot the loop 220 about the axle 250 to better accommodate the angle of the strap.

Figure 22:
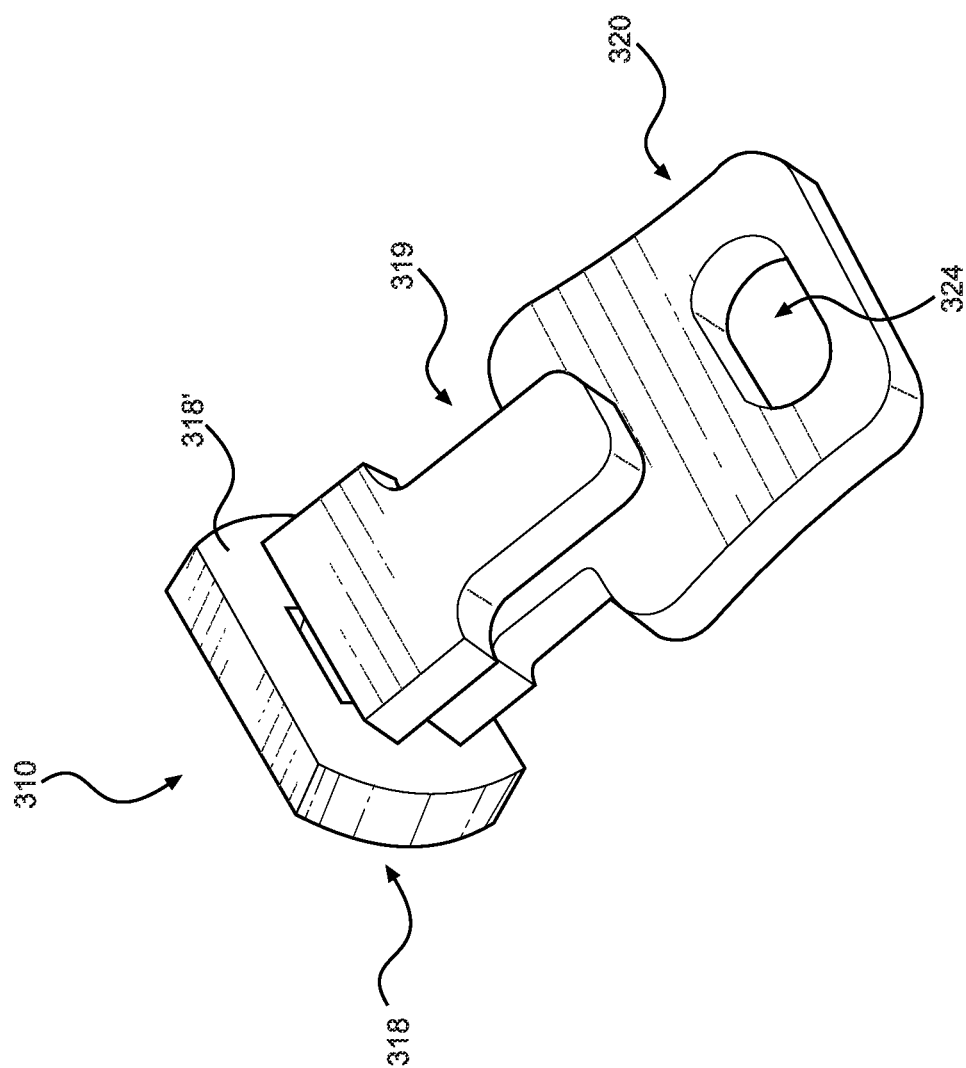
FIG. 22 is a view in perspective illustrating an alternative embodiment of the present invention.
Figure 23:
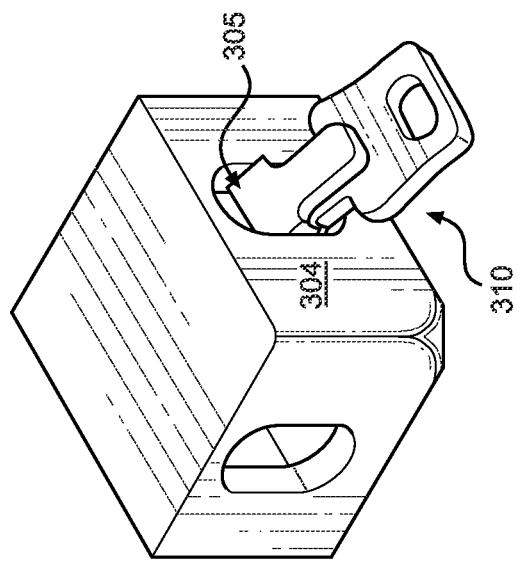
FIG. 23 is a view in perspective illustrating the embodiment of FIG. 22 in place within a corner casting of an ISO container.
Figure 24:
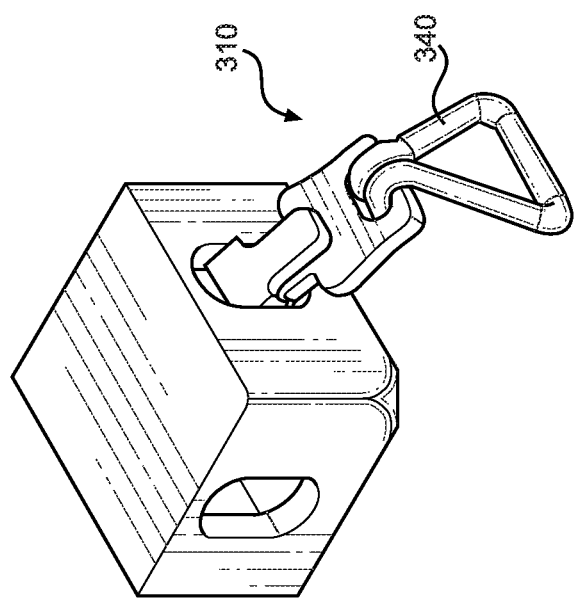
FIG. 24 is a view in perspective illustrating the embodiment of FIG. 23 with a strap hook attached to the loop.

Another alternative fastener 310 is shown in FIGS. 22-24. The fastener 310 has an elongated nut 318 at one end and a loop 320 at the opposite end of a shaft 319. The elongated nut 318 has a face 318' that is contained within a plane. In the embodiment of FIGS. 22-24, the surfaces of the face 318' that are within the plane are contiguous on the face 318'. However, in other embodiments, surfaces that are within a plane may be discontiguous, as with the surfaces of the nut 18 of FIGS. 3-4 and 13, particularly the surfaces of the recesses 18L and 18R that are within the same plane.

The opening 324 permits a hook, chain, strap or other tying member or attaching means to connect to the fastener 310. The fastener may be placed in the aperture 305 of a corner casting 304 by vertically aligning the nut 318 with the elongated aperture 305, inserting and rotating about the axis of the shaft 319 about 90 degrees to the position shown in FIG. 23. The length of the nut 318 is greater than the width of the aperture 305, but not greater than the height. It will be apparent that a strap may be inserted through the opening 324 to connect to a structure on which a container rests. Alternatively, another structure, such as the strap hook 340 shown in FIG. 24 may be inserted in the opening to permit further accommodation of a strap attached to the structure at a lateral position.

The shaft 319 extends at an angle to the plane of the face 318' that is in the range of about 10-80 degrees, but is substantially offset from parallel and from perpendicular to the face 318'. This angle permits the shaft 319 to extend in a direction toward, and therefore along the direction of force application, where a hook, strap or other fastener component may be exerting a force when the fastener 310 is in use while the face 318' is seated against the interior face of the corner casting 304. The interior face of the corner casting, not visible in FIGS. 23-24, may be planar, thereby urging the planar surfaces of the face 318' to seat thereagainst and creating an advantageous mechanical cooperation.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. An apparatus for fastening an ISO container to a supporting structure, the apparatus comprising:
    (a) a lock plate having at least one slot with a slot width, wherein the at least one slot is defined by a lock plate sidewall near a first lock plate end, wherein the lock plate has a gap with a gap width, which gap extends through the lock plate sidewall from the first lock plate end to the at least one slot;
    (b) a threaded shaft, having a shaft width, configured for extending through the gap into the at least one slot, wherein the shaft has a head near one end with a head width that is greater than the slot width and the gap width, and wherein the gap width and the slot width are at least as large as the shaft width, thereby permitting movement of the shaft through the gap and into the at least one slot; and
    (c) an elongated nut disposed on the shaft for extending through an elongated aperture formed in the container that has an aperture length that is greater than an aperture width.

2. The apparatus in accordance with claim 1, further comprising at least one hook on the lock plate near a second, opposite lock plate end for mounting on the structure.

3. The apparatus in accordance with claim 2, wherein the lock plate comprises:
    (a) an upper panel in which the slot and gap are formed; and
    (b) a lower panel, disposed about 90 degrees relative to the upper panel, on which the at least one hook is disposed.

4. The apparatus in accordance with claim 1, wherein the shaft and an opening through the elongated nut, through which the shaft extends, are threaded to permit clamping of at least a portion of the container between the plate and the elongated nut by rotating the threaded shaft relative to the elongated nut.

5. The apparatus in accordance with claim 1, wherein the elongated nut comprises:
    (a) a first recess near a first end of the elongated nut, the first recess defining a first side of an insert portion; and
    (b) a second recess near a second, opposite end of the elongated nut, the second recess defining a second side of the insert portion, wherein the insert portion has a width between the first and second sides of the insert portion that is narrower than the aperture width.

6. The apparatus in accordance with claim 1, further comprising:
    (a) a washer disposed on the threaded shaft and having a washer width; and
    (b) a front lock plate mounted to the lock plate, wherein the front lock plate has a front lock plate gap that is aligned with the gap in the lock plate and a front lock plate slot that is aligned with the at least one slot in the lock plate;
    wherein the lock plate gap has a lock plate gap width that is smaller than the washer width;
    wherein the front lock plate slot has a front lock plate slot width that is greater than the slot width of the lock plate and at least as large as the washer width, thereby permitting the washer to seat against the lock plate while the front lock plate prevents the washer from passing through the front lock plate gap.

7. An apparatus in accordance with claim 1, wherein the supporting structure is a second ISO container and the apparatus further comprises:
    (a) the lock plate having a second slot with a second slot width, wherein the second slot is defined by the lock plate sidewall near a second lock plate end, wherein the lock plate has a second gap with a second gap width, which second gap extends through the lock plate sidewall from the second lock plate end to the second slot;
    (b) a second threaded shaft, having a second shaft width, configured for extending through the second gap into the second slot, wherein the second shaft has a second head near one end with a second head width that is greater than the second gap width and the second slot width, and wherein the second gap width and the second slot width are at least as large as the second shaft width, thereby permitting movement of the second shaft through the second gap and into the second slot; and
    (c) a second elongated nut disposed on the second shaft for extending through a second elongated aperture formed in the second ISO container, wherein the second elongated nut has an aperture length that is greater than an aperture width.

8. An apparatus fastened to an ISO container and a supporting structure that transports the container, the apparatus comprising:
    (a) a lock plate having at least one slot with a slot width, wherein the at least one slot is defined by a lock plate sidewall near a first lock plate end, wherein the lock plate has a gap with a gap width, which gap extends through the lock plate sidewall from the first lock plate end to the at least one slot;
    (b) a threaded shaft, having a shaft width, extended through the at least one slot, wherein the shaft has a head near one end with a head width that is greater than the slot width and the gap width, and wherein the gap width and the slot width are at least as large as the shaft width, thereby permitting movement of the shaft through the gap and into the at least one slot; and (c) an elongated nut disposed on the shaft and disposed in a corner casting of the container, the nut having a longitudinal axis oriented transverse to a longitudinal axis of an elongated aperture, having an aperture length that is greater than an aperture width, of the corner casting to resist removal of the nut from the corner casting.

9. The apparatus in accordance with claim 8, further comprising at least one hook near a second, opposite lock plate end mounted to the structure.

10. The apparatus in accordance with claim 8, wherein the shaft and an opening through the elongated nut, through which the shaft extends, are threaded to permit clamping of at least a portion of the container between the plate and the elongated nut by rotating the threaded shaft relative to the elongated nut.

11. A method of fastening an ISO container to a supporting structure, the method comprising:

(a) aligning a longitudinal axis of an elongated nut, which is disposed on a shaft, substantially parallel to a longitudinal axis of an elongated aperture of a corner casting on the ISO container;

(b) extending the nut through the elongated aperture while maintaining the substantially parallel relationship;

(c) rotating the nut, after the nut has passed through the elongated aperture, until the longitudinal axis of the nut is oriented transverse to the longitudinal axis of the elongated aperture to resist removal of the nut from the corner casting;

(d) extending the shaft through a gap formed in a first end of a lock plate, and then continuing to extend the shaft into a slot formed near the first end and contiguous with the gap; and (e) attaching a second, opposite end of the lock plate to the supporting structure.

12. The method in accordance with claim 11, further comprising:

(a) disposing a washer on the threaded shaft, the washer having a washer width; and (b) disposing the washer in a front lock plate gap of a front lock plate that is mounted to the lock plate, wherein the front lock plate gap is aligned with the gap in the lock plate and a front lock plate slot of the front lock plate is aligned with the at least one slot of the front lock plate in the lock plate;

wherein the lock plate gap has a lock plate gap width that is smaller than the washer width;

wherein the front lock plate slot has a front lock plate slot width that is greater than a slot width of the lock plate slot and at least as large as the washer width, thereby permitting the washer to seat against the lock plate while the front lock plate prevents the washer from passing through the front lock plate gap.

13. The method in accordance with claim 12, wherein the step of attaching the second, opposite end of the lock plate to the supporting structure comprises extending at least one hook, which is mounted near the second end of the lock plate, around the supporting structure.

14. The method in accordance with claim 11, wherein the step of rotating the nut further comprises aligning a first recess near a first end of the elongated nut, the first recess defining a first side of an insert portion, with a first side of the elongated aperture, and aligning a second recess near a second, opposite end of the elongated nut, the second recess defining a second side of the insert portion, with a second, opposite side of the elongated aperture.

15. The method in accordance with claim 14, further comprising rotating the shaft until the insert portion of the elongated nut, with a width measured between the first and second sides of the insert portion that is no wider than a width of the elongated aperture, is disposed between opposite sides of the aperture.

* * * * *